United States Patent
Lee et al.

(10) Patent No.: US 12,294,784 B2
(45) Date of Patent: May 6, 2025

(54) ELECTRONIC DEVICE INCLUDING A PLURALITY OF CAMERAS AND OPERATING METHOD THEREOF

(71) Applicant: SAMSUNG ELECTRONICS CO., LTD., Suwon-si (KR)

(72) Inventors: Sanghun Lee, Suwon-si (KR); Sungoh Kim, Suwon-si (KR); Dasom Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 202 days.

(21) Appl. No.: 18/081,243

(22) Filed: Dec. 14, 2022

(65) Prior Publication Data

US 2023/0113499 A1    Apr. 13, 2023

Related U.S. Application Data

(63) Continuation of application No. PCT/KR2022/009596, filed on Jul. 4, 2022.

(30) Foreign Application Priority Data

Sep. 2, 2021 (KR) ......................... 10-2021-0117050

(51) Int. Cl.
*H04N 23/90* (2023.01)
*G06T 7/70* (2017.01)
(Continued)

(52) U.S. Cl.
CPC ............. *H04N 23/675* (2023.01); *G06T 7/70* (2017.01); *H04N 5/2628* (2013.01);
(Continued)

(58) Field of Classification Search
None
See application file for complete search history.

(56) References Cited

U.S. PATENT DOCUMENTS

| | | |
|---|---|---|
| 9,451,150 B2 | 9/2016 | Shibagami |
| 10,511,758 B2 | 12/2019 | Hong et al. |

(Continued)

FOREIGN PATENT DOCUMENTS

| | | |
|---|---|---|
| CN | 112565611 A | 3/2021 |
| JP | 2007281532 A | 10/2007 |

(Continued)

OTHER PUBLICATIONS

International Search Report and Written Opinion for International Application No. PCT/KR2022/009596; International Filing date Jul. 4, 2022; Report Mail Date Oct. 6, 2022; 10 pages.

(Continued)

*Primary Examiner* — Samuel D Fereja
(74) *Attorney, Agent, or Firm* — CANTOR COLBURN LLP

(57) ABSTRACT

An electronic device may include a first camera, a second camera, a display, and at least one processor electrically connected to the first camera, the second camera, and the display. The at least one processor may acquire a first image frame through the first camera, display the first image frame on the display as a preview, determine a first point corresponding to a user input within the first image frame in response to a reception of the user input through the display, determine a second point that is distinguished from the first point and satisfies a predetermined condition within the first image frame, acquire a first video focused on a first subject corresponding to the first point through the first camera, and acquire a second video focused on a second subject corresponding to the second point through the second camera. Various other embodiments drawn by the specification are possible.

16 Claims, 19 Drawing Sheets

(51) Int. Cl.
    *H04N 5/262*     (2006.01)
    *H04N 23/611*     (2023.01)
    *H04N 23/62*     (2023.01)
    *H04N 23/63*     (2023.01)
    *H04N 23/67*     (2023.01)
    *H04N 23/80*     (2023.01)

(52) U.S. Cl.
    CPC .......... *H04N 23/611* (2023.01); *H04N 23/62* (2023.01); *H04N 23/632* (2023.01); *H04N 23/815* (2023.01); *H04N 23/90* (2023.01); *G06T 2207/30196* (2013.01)

(56) References Cited

U.S. PATENT DOCUMENTS

| | | | |
|---|---|---|---|
| 10,602,055 B2 | 3/2020 | Li | |
| 10,606,398 B2 | 3/2020 | Kim et al. | |
| 2012/0105579 A1* | 5/2012 | Jeon | H04N 5/772 348/47 |
| 2013/0155309 A1 | 6/2013 | Hill et al. | |
| 2013/0258167 A1 | 10/2013 | Gum | |
| 2014/0049611 A1 | 2/2014 | Woo et al. | |
| 2016/0077658 A1* | 3/2016 | Kim | G06F 3/0412 345/173 |
| 2017/0118404 A1 | 4/2017 | Song | |
| 2018/0181196 A1* | 6/2018 | Lee | H04N 23/683 |
| 2018/0367725 A1 | 12/2018 | Li | |
| 2020/0099851 A1 | 3/2020 | Chino et al. | |

FOREIGN PATENT DOCUMENTS

| | | | |
|---|---|---|---|
| JP | 2010177921 A | | 8/2010 |
| JP | 2011125051 A | * | 6/2011 |
| JP | 2014103643 A | | 6/2014 |
| JP | 2019033544 A | | 2/2019 |
| JP | 2020096317 A | | 6/2020 |
| KR | 20120046452 A | | 5/2012 |
| KR | 20140148448 A | | 12/2014 |
| KR | 20170010588 A | | 2/2017 |
| KR | 20170046396 A | | 5/2017 |
| KR | 101952684 B1 | | 2/2019 |
| KR | 20190102871 A | | 9/2019 |
| KR | 102137921 B1 | | 7/2020 |
| KR | 102252448 B1 | | 5/2021 |
| WO | 2018159864 A1 | | 9/2018 |

OTHER PUBLICATIONS

Extended European Search Report Issued In EP Application No. 22864842.4-1207, Mail Date Sep. 9, 2024, 31 Pages.

* cited by examiner

ELECTRONIC DEVICE INCLUDING A PLURALITY OF CAMERAS AND OPERATING METHOD THEREOF

CROSS-REFERENCE TO RELATED APPLICATION(S

This application is a continuation application, claiming priority under § 365(c), of an International Application No. PCT/KR2022/009596, filed on Jul. 4, 2022, which is based on and claims the benefit of a Korean patent application number 10-2021-0117050, filed on Sep. 2, 2021, in the Korean Intellectual Property Office, the disclosure of which is incorporated by reference herein in its entirety.

TECHNICAL FIELD

Various embodiments of the disclosure relate to technology for capturing images focusing on different subjects through a plurality of cameras.

BACKGROUND ART

Recently, according to trends resulting in diversifications of mobile devices, demands for improvements of photo capturing or video capturing functions using the mobile device have increased. Accordingly, mobile devices increasingly provide various image (i.e., photo or video) capturing functions and an auto focus (AF) function for controlling focus during image capturing.

A method of performing the AF function includes a contrast AF functionality and a phase AF functionality. The contrast AF functionality is a method of acquiring image frames while moving the lens and finding the location of the lens making a sharpness of the acquired image frames become the highest. The phase AF functionality is a method of separating light incident to the camera and finding an appropriate location of the lens based on two acquired image frames. The electronic device can capture an image focused on a specific subject through the AF functionality.

DISCLOSURE

Technical Problem

The conventional electronic device captures an image focused on one subject through one camera, and thus has a problem in that it is difficult to acquire images where each of the images is focused on two or more subjects. For example, when the conventional electronic device acquires an image of a first subject and a second subject and the image is focused on the first subject, there is often a problem in that it is impossible to acquire an image focused on the second subject. Accordingly, if a user captured a video focused on a first subject through the conventional electronic device but thereafter desires to focus on a second subject it is difficult to perform a modification of the video.

Technical Solution

An electronic device according to an embodiment of the disclosure may include a first camera, a second camera, a display, and at least one processor electrically connected to the first camera, the second camera, and the display. The at least one processor may acquire a first image frame through the first camera, display the first image frame on the display as a preview, determine a first point corresponding to a user input within the first image frame in response to a reception of the user input through the display, determine a second point that is distinguished from the first point and satisfies a predetermined condition within the first image frame, acquire a first video focused on a first subject corresponding to the first point through the first camera, and acquire a second video focused on a second subject corresponding to the second point through the second camera.

A method of operating an electronic device according to an embodiment may include acquiring a first image frame through a first camera included in the electronic device, displaying the first image frame on a display included in the electronic device as a preview, determining a first point corresponding to a user input within the first image frame in response to a reception of the user input through the display, determining a second point that is distinguished from the first point and satisfies a predetermined condition within the first image frame, acquiring a first video focused on a first subject corresponding to the first point through the first camera, and acquiring a second video focused on a second subject corresponding to the second point through the second camera included in the electronic device.

An electronic device according to an embodiment of the disclosure may include a first camera, a second camera, a display, and at least one processor electrically connected to the first camera, the second camera, and the display. The at least one processor may acquire a first image frame through the first camera, display the first image frame on the display as a preview, determine whether a user input is received through the display, determine whether a predetermined type of an object is included in the first image frame, determine an importance for at least one subject included in the first image frame, determine that a first point and a second point are within the first image frame based on at least one of whether the user input is received, whether the predetermined type of the object is included, or the importance, acquire a first video focused on a first subject corresponding to the first point through the first camera, and acquire a second video focused on a second subject corresponding to the second point through the second camera.

Advantageous Effects

According to various embodiments disclosed in this document, the electronic device may include a plurality of cameras and can capture images focused on different subjects through the plurality of cameras. For example, the electronic device according to the disclosure can acquire an image focused on a first subject through a first camera and can acquire an image focused on a second subject through a second camera. Accordingly, even when the user captures a first video focused on the first subject through the electronic device according to the disclosure, a second video focused on the second subject may also be stored. After capturing the first video, the user may change the same to the second video focused on another subject, and may generate a new video file based on at least a portion of the first video and at least a portion of the second video.

The effects that can be realized by the disclosure are not limited to the above-described effects, and other effects that have not been mentioned may be clearly understood by those skilled in the art from the following description.

DESCRIPTION OF DRAWINGS

In connection with description of drawings, the same or similar reference numerals may be used for the same or similar elements.

MODE FOR INVENTION

Hereinafter, various embodiments of the disclosure will be described with reference to the accompanying drawings. However, this does not limit the disclosure to specific embodiments, and it should be understood that various modifications, equivalent, and/or alternative of embodiments of the disclosure are included.

Figure 1:
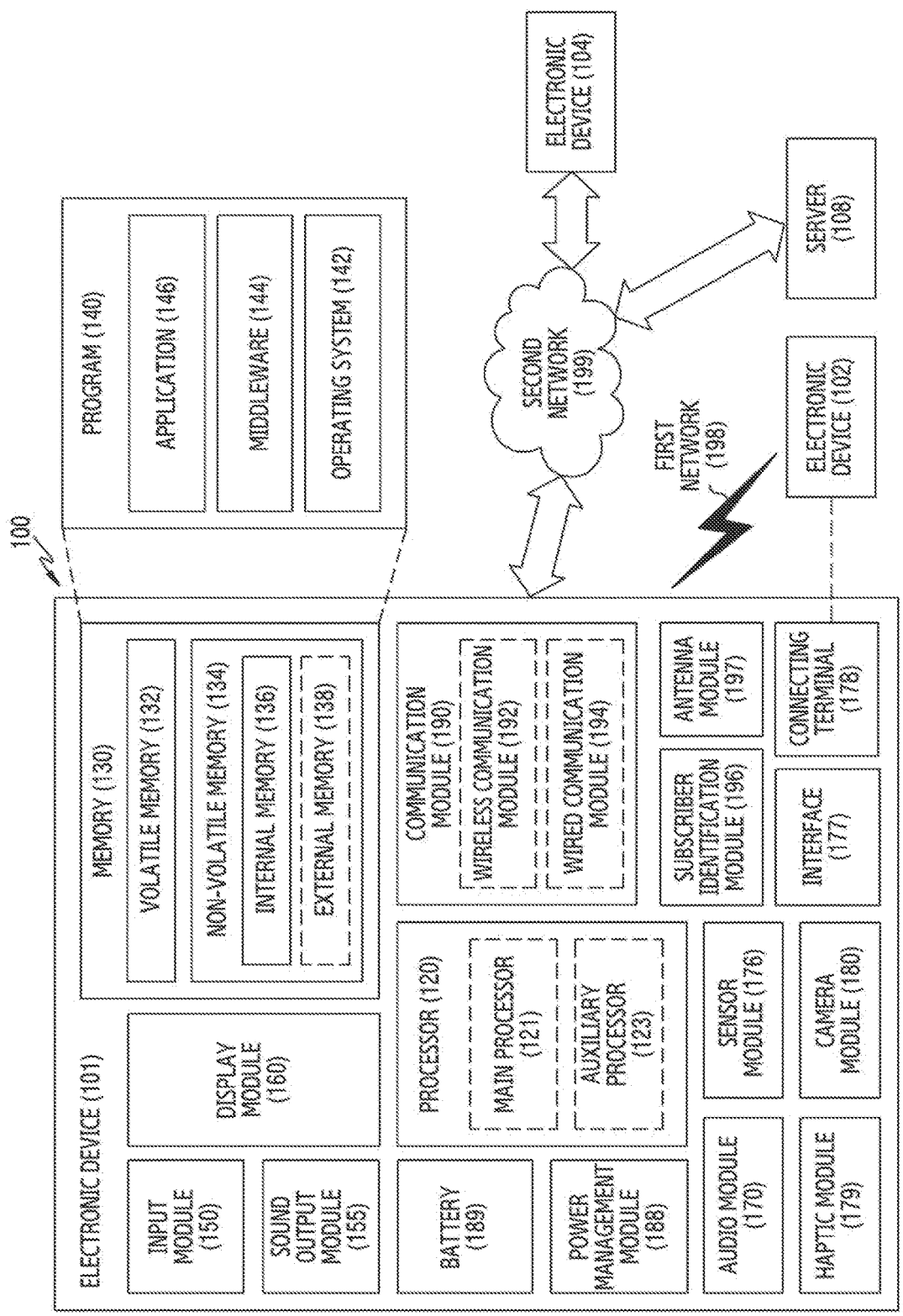
FIG. 1 is a block diagram illustrating an electronic device within a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
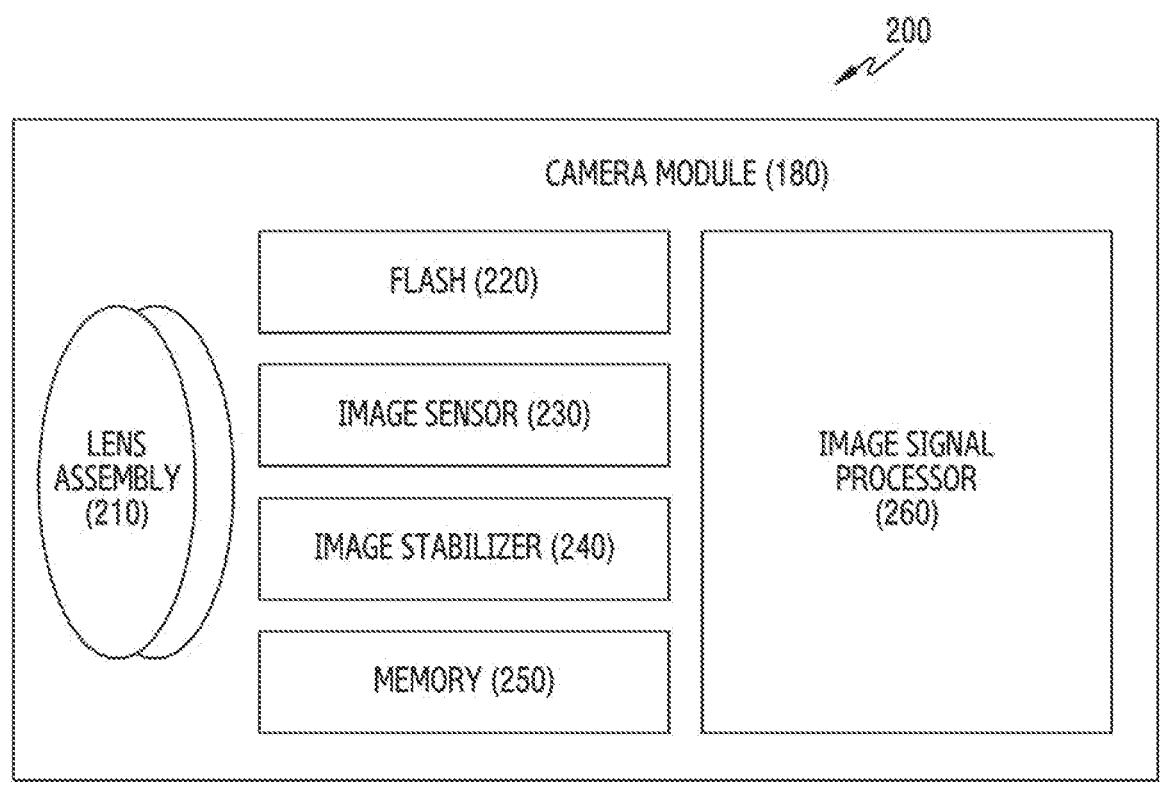
FIG. 2 is a block diagram illustrating a camera module according to various embodiments.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, autofocusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform a control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules180 may form a telephoto camera. Similarly, at least one of the plurality of camera modules 180 may form, for example, a front camera and at least another of the plurality of camera modules 180 may form a rear camera.

Figure 3A:
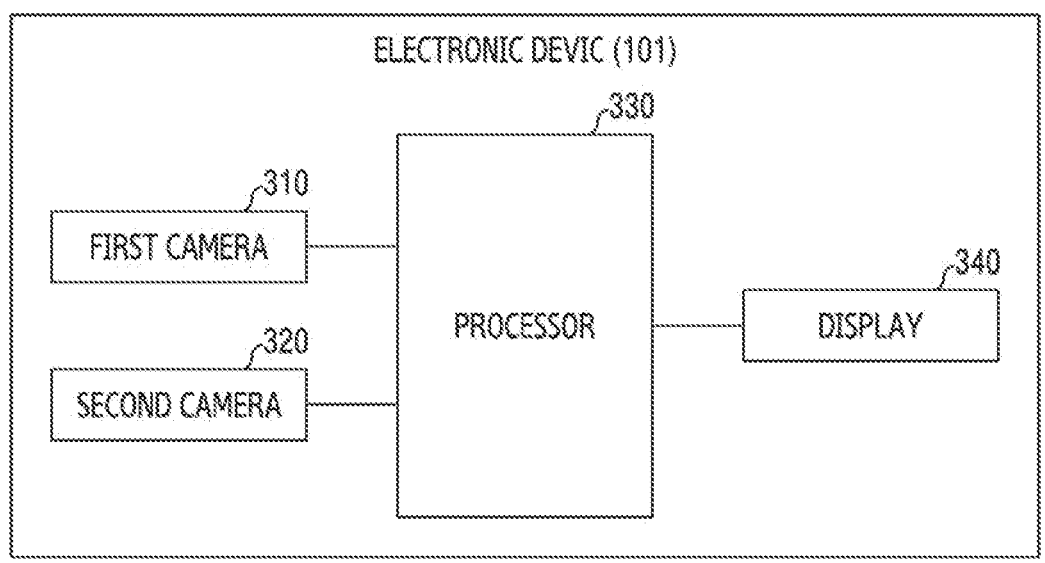
FIG. 3A illustrates hardware components of the electronic device according to an embodiment.
Figure 3B:
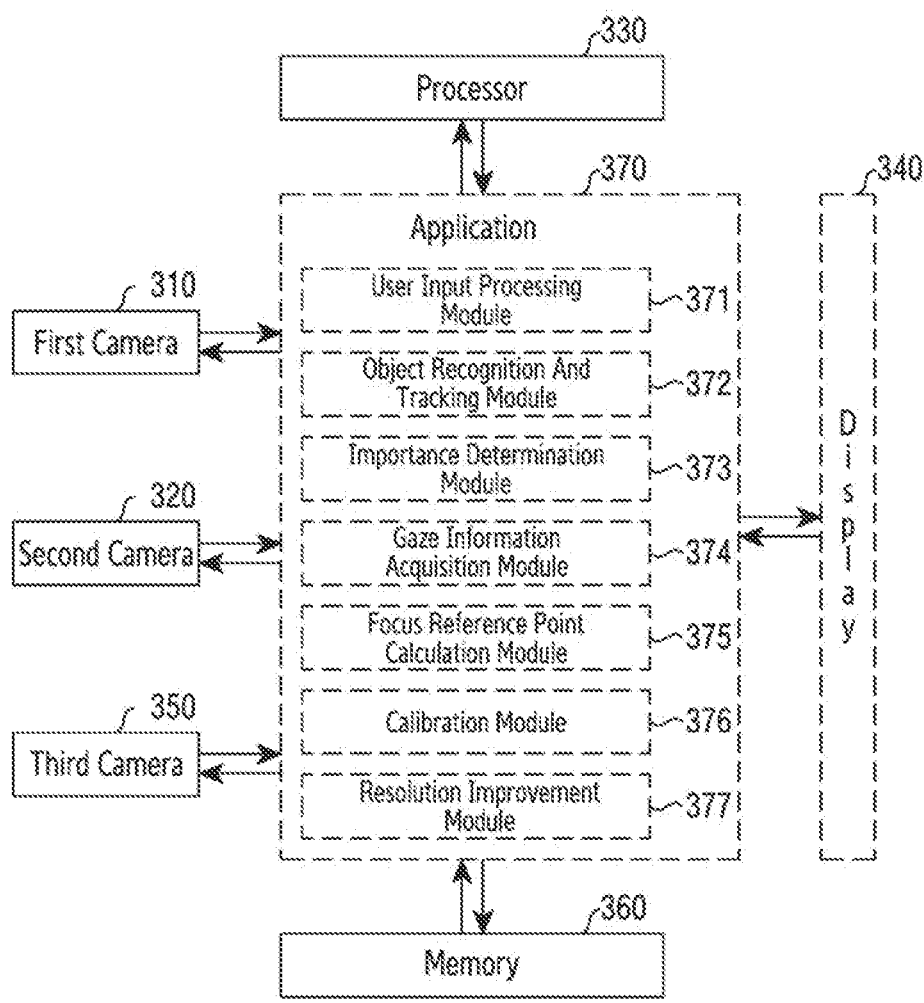
FIG. 3B illustrates the concept of controlling functions related to capturing by the electronic device according to an embodiment.

FIG. 3A illustrates hardware components of the electronic device 101 according to an embodiment. FIG. 3B illustrates a concept of controlling functions related to capturing by the electronic device 101 according to an embodiment.

Referring to FIG. 3A, the electronic device 101 may include a first camera 310, a second camera 320, a processor 330, and a display 340. The electronic device 101 of FIG. 3A may correspond to the electronic device 101 of FIG. 1. The processor 330 of FIG. 3A may correspond to the processor 120 of FIG. 1. The display 340 of FIG. 3A may correspond to the display module 160 of FIG. 1. Elements illustrated in FIG. 3A are only examples, and the electronic device 101 may further include additional elements. For example, the electronic device 101 may further include a depth sensor (or a distance sensor) for measuring a distance between the electronic device 101 and an object.

According to an embodiment, the first camera 310 may correspond to the camera module 180 of FIGS. 1 and 2. Further, according to an embodiment, the second camera 320 may correspond to the camera module 180 of FIGS. 1 and 2. The first camera 310 and the second camera 320 may be rear camera arranged in the electronic device 101 to face the rear surface of the electronic device 101. According to an embodiment, the first camera 310 may have a first field of view (FOV) and the second camera 320 may have a second FOV including the first FOV. For example, the first camera 310 may be a telecamera and the second camera 320 may be a wide-angle camera. In another example, the first camera 310 may be a normal camera and the second camera 320 may be a super wide angle camera. However, in an example, the first FOV of the first camera 310 may include the second FOV of the second camera 320 according to another embodiment (i.e., in an overlapping or nested arrangement).

According to an embodiment, although FIG. 3A illustrates that the electronic device 101 includes two cameras (for example, the first camera 310 and the second camera 320), it is only an example and various embodiments that can be implemented by those skilled in the art are possible. For example, the electronic device 101 may further include a camera module arranged in the rear surface of the electronic device 101 as well as the first camera 310 and the second camera 320. However, the disclosure premises that the number of rear cameras arranged in the electronic device 101 is two for convenience of description.

According to an embodiment, the first camera 310 may acquire a first image frame for light received along an optical axis. The processor 330 may acquire the first image frame through the first camera 310. For example, the processor 330 may acquire the first image frame corresponding to the first FOV through the first camera 310. According to an embodiment, the second camera 320 may acquire a second image frame for light received along an optical axis. The processor 330 may acquire the second image frame through the second camera 320. For example, the processor 330 may acquire the second image frame corresponding to the second FOV through the second camera 320.

According to an embodiment, the first camera 310 and the second camera 320 may support an auto focus (AF) function. The processor 330 may determine a subject on which the focus is configured through methods described with reference to FIG. 4 and figures thereafter and control the first camera 310 and/or the second camera 320 to focus on a specific subject. For example, the processor 330 may perform a control to acquire an image focused on a first subject by the first camera 310 by moving at least one lens included in the first camera 310. The processor 330 may acquire the image (for example, a photo or a video) focused on the first subject through the first camera 310. In another example, the processor 330 may perform a control to acquire an image focused on a second subject by the second camera 320 by moving at least one lens included in the second camera 320. The processor 330 may acquire the image (for example, a photo or a video) focused on the second subject through the second camera 320.

According to an embodiment, the processor 330 may perform/control various functions supported by the electronic device 101. For example, the processor 330 may execute an application and control various hardware components by executing a code made in a programming language stored in the memory 360. For example, the processor 330 may execute an application (for example, a camera application) supporting a capturing function stored in the memory 360. Further, the processor 330 may execute the first camera 310 and/or the second camera 320, and may configure and support an appropriate capturing mode in which the first camera 310 and/or the second camera 320 perform operations intended by the user.

According to an embodiment, the display 340 may display an execution screen of an application executed by the processor 330 or content (for example, photos or videos) stored in the memory 360. For example, the processor 330 may display the first image frame acquired through the first camera 310 on the display 340 as a preview while the camera application is executed. In another example, the processor 330 may display photos or videos stored in the memory 360 on the memory 360 while a gallery application is executed.

According to an embodiment, the display 340 may be implemented integrally with the touch panel. The display 340 may support a touch function, detect a user input (for example, a touch input using a finger), and transfer the same to the processor 330. The display 340 may be connected to a display-driving circuit (display driver integrated circuit (DDIC) for driving the display 340, and the touch panel may be connected to a touch IC for detecting a touch coordinate and processing an algorithm related to a touch. The DDIC and the touch IC may be integrally formed in an embodiment and may be separately formed in another embodiment. The DDIC and/or the touch IC may be electrically connected to the processor 330.

Referring to FIG. 3B, the electronic device 101 may further include a third camera 350 and a memory 360. According to an embodiment, the memory 360 may correspond to the memory 130 of FIG. 1.

According to an embodiment, the third camera 350 may correspond to the camera module 180 of FIGS. 1 and 2. According to an embodiment, the third camera 350 may be a front camera disposed on the front surface of the electronic device 101 to face the front surface of the electronic device 101. According to an embodiment, the first camera 310 and the second camera 320 may be disposed on the electronic device 101 to face a first direction, and the third camera 350 may be disposed on the electronic device 101 to face a second direction different from the first direction. For example, the first direction may be the rear surface of the electronic device 101 and the second direction may be the front surface of the electronic device 101. The front surface of the electronic device 101 may be the surface on which the display 340 of the electronic device 101 is disposed. According to an embodiment, the third camera 350 may acquire an image including a user's face while the application 370 according to the disclosure is executed. The processor 330 may acquire gaze information for the location where the user's eyes are directed on the display 340 through the third camera 350. For example, the processor 330 may acquire an image including the user's face through the third camera 350 while the application 370 is executed and determine the location where the user's eyes are directed on the display 340 based on the image.

According to an embodiment, the memory 360 may store instructions which can be executed by the processor 330. The memory 360 may be understood as an element for temporarily storing data, such as a random access memory (RAM), and as an element for permanently storing data, such as a solid state drive (SSD). For example, the processor 330 may call the instructions stored in the SSD to implement a software module in a RAM space. In various embodiments, the memory 360 may include various types of memory, and a type of memory suitable for the purpose of the device may be adopted.

In an embodiment, the memory 360 may store the application 370 associated with the first camera 310 and the second camera 320. For example, the memory 360 may store a camera application. The camera application may support various capturing functions such as photo capturing, video capturing, panorama capturing, and slow motion capturing.

In an embodiment, the processor 330 may execute various types of applications associated with the first camera 310 and the second camera 320 as well as the application 370 according to the disclosure. For example, at least one of a chatting application, a web browser application, an e-mail application, or a shopping application may use the first camera 310 and the second camera 320 in order to support a video call, photo/video attachment, a streaming service, and a product image or a product-related virtual reality (VR) capturing function.

Referring to FIG. 3B, the electronic device 101 may use a hardware and/or software module to support various capturing-related functions. For example, the processor 330 may execute the instructions stored in the memory 360 to drive a user input processing module 371, an object recognition and tracking module 372, an importance determination module 373, a gaze information acquisition module 374, a focus reference point calculation module 375, a calibration module 376, and a resolution improvement module 377, to execute the application 370. In various embodiments, software modules different from those in FIG. 3B may be implemented. For example, at least two modules may be integrated into one module or one module may be divided into two or more modules. In another example, some of the software modules illustrated in FIG. 3B may be omitted.

According to an embodiment, the user input processing module 371 may process a user input received through the display 340. For example, when receiving a user touch input through the display 340, the user input processing module 371 may determine the location of a point corresponding to the touch input within a preview image displayed on the display 340. The operation performed by the user input processing module 371 is described below with reference to FIG. 5.

According to an embodiment, the object recognition and tracking module 372 may determine whether a predetermined type of an object is included in the image frame acquired through the first camera 310 and/or the second camera 320. For example, the predetermined type may include at least one of a human face, human eyes, animal eyes, or an animal body. According to an embodiment, the object recognition and tracking module 372 may be a set of lower modules for tracking a single object. For example, the object recognition and tracking module 372 may be understood as including at least one of a lower module for recognizing and tracking a human face, a module for recognizing and tracking human eyes, a module for recognizing and tracking animal eyes, or a module for recognizing and tracking an animal body. The operation performed by the object recognition and tracking module 372 is described below with reference to FIG. 8.

According to an embodiment, the importance determination module 373 may determine an importance of at least one object included in the image frame acquired through the first camera 310 and/or the second camera 320. For example, the importance determination module 373 may perform machine learning or deep learning based on pairs of specific images and predefined importance judgements corresponding to the specific images and may determine the importance through a machine learning model or a deep learning model. The operation performed by the importance determination module 373 is described below with reference to FIG. 9.

According to an embodiment, the gaze information acquisition module 374 may acquire gaze information for the location where the user's eyes are directed on the display 340 based on image frames acquired through the third camera 350. For example, the gaze information acquisition module 374 may acquire information indicating which area of the display 340 is viewed by the user. The operation performed by the gaze information acquisition module 374 is described with reference to FIG. 10.

According to an embodiment, the focus reference point calculation module 375 may determine a first point and a second point among focus reference point candidates acquired through at least one of the user input processing module 371, the object recognition and tracking module 372, the importance determination module 373, and the gaze information acquisition module 374. For example, the processor 330 may acquire two focus reference point candidates by driving an operation of the user input processing module 371 and by identifying the first point and the second point among the two focus reference point candidates according to a pre-configured priority by driving an operation of the focus reference point calculation module 375. According to an embodiment, the processor 330 may perform a control to execute an AF function for configuring the focus on the determined first point and second point by the first camera 310 and the second camera 320, respectively. In addition, various operations which can be performed by the focus reference point calculation module 375 are described below with reference to FIGS. 16A to 16C.

According to an embodiment, the calibration module 376 may calibrate a difference between a first image frame acquired through the first camera 310 and a second image frame acquired through the second camera 320, the difference being generated by a difference between the first camera 310 and the second camera 320. For example, the first camera 310 and the second camera 320 may have different FOVs, may be disposed on different locations of the electronic device 101, and may have different lens characteristics. The processor 330 may acquire the first image frame through the first camera 310 and the second image frame through the second camera 320. The calibration module 376 may calibrate the difference between the first camera 310 and the second camera 320 through calibration for the first image frame and the second image frame. The operation performed by the calibration module 376 is described below with reference to FIG. 6.

According to an embodiment, the resolution improvement module 377 may reduce the difference between the first image frame acquired through the first camera 310 and the second image frame acquired through the second camera 320. For example, the first FOV of the first camera 310 may be included in the second FOV of the second camera 320, and the processor 330 may crop an area corresponding to the first FOV in the second image frame. For example, cropping the area corresponding to the first FOV in the second image frame by the processor 330 may mean that the processor 330 cuts an area except for an area corresponding to the first FOV in the second image frame. When the processor 330 crops the area corresponding to the first FOV in the second image frame, a subject included in the cropped area may be the same as a subject included in the first image frame. According to an embodiment, when the processor 330 crops a portion of the second image frame, the portion of the second image frame may have a resolution lower than that of the first image frame. The resolution improvement module 377 may improve the resolution of the portion of the second image frame. The operation performed by the resolution improvement module 377 is described below with reference to FIG. 6.

According to an embodiment, it may be understood that functions performed by the user input processing module 371, the object recognition and tracking module 372, the importance determination module 373, the gaze information acquisition module 374, the focus reference point calculation module 375, the calibration module 376, and the resolution improvement module 377 are performed as the processor 330 executes the instructions stored in the memory 360. Further, in various embodiments, the electronic device 101 may use one or more hardware processing circuits to perform various functions and operations disclosed in this document. For example, an application processor (AP) included in a mobile device, the image signaling processor (ISP) 260 installed in the camera module, a DDIC, a touch IC, a communication processor (CP), a hardware encoder, and the like may be used to implement various embodiments disclosed in this document. In this document, the processor 330 may be understood as including at least one processor described above.

Further, the connection relation between the hardware/software illustrated in FIG. 3 is only for convenience of description and does not limit the flow/direction of data or commands. The elements included in the electronic device 101 may have various electrical/operative connection relations.

Figure 4:
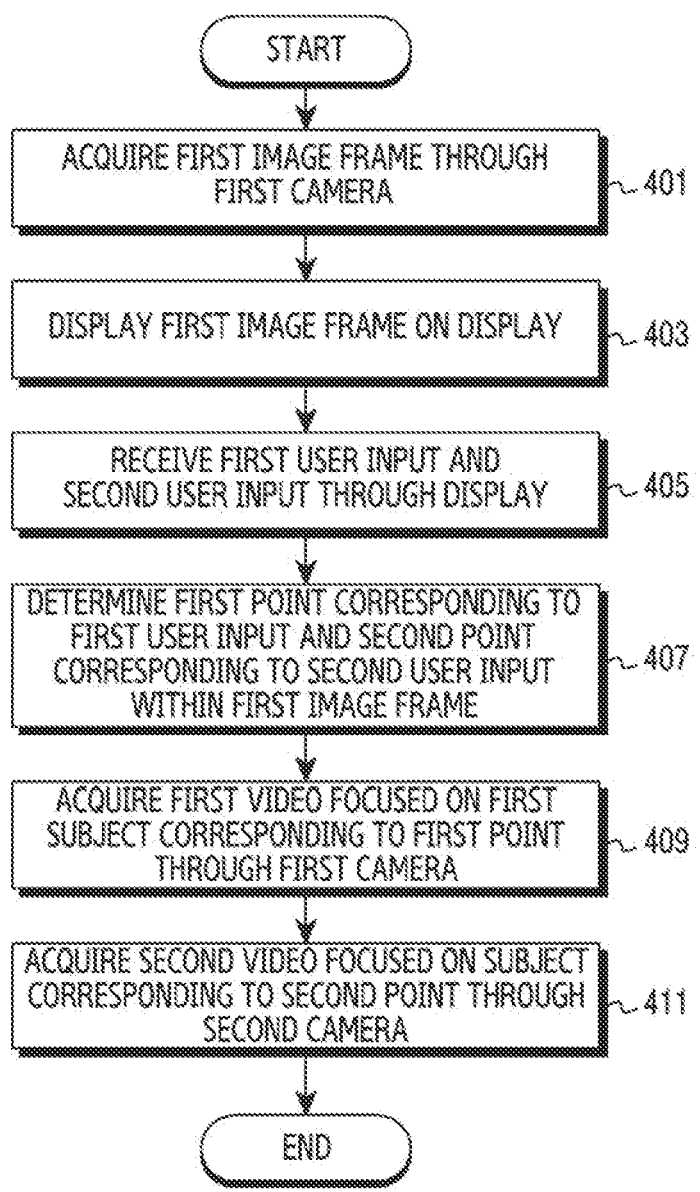
FIG. 4 is a flowchart illustrating the flow of an operation in which the electronic device acquires a first video and a second video when a first user input and a second user input are received according to an embodiment.

FIG. 4 is a flowchart illustrating the flow of an operation of acquiring a first video and a second video when the electronic device 101 receives a first user input and a second user input according to an embodiment. Operations illustrated in FIG. 4 may be performed by the processor 330 of FIG. 3A. It may be understood that the operations illustrated in FIG. 4 are performed by at least driving the user input processing module 371 and the focus reference point calculation module 375 illustrated in FIG. 3B.

According to an embodiment, in operation 401, the processor 330 may acquire a first image frame through the first camera 310. According to an embodiment, in operation 403, the processor 330 may display the first image frame on the display 340 as a preview. For example, the processor 330 may display at least a portion of the first image frame on the display 340 as a preview.

According to an embodiment, in operation 405, the processor 330 may receive a first user input and a second user input through the display 340. For example, the processor 330 may receive a user touch input two times through the display 340. The first user input and the second user input may be touch inputs for different points of the display 340. The processor 330 may chronologically receive the first user input and the second user input through the display 340. The processor 330 may receive the first user input and the second user input by driving an operation of the user input processing module 371 while the application 370 is executed.

According to an embodiment, in operation 407, the processor 330 may determine a first point corresponding to the first user input and a second point corresponding to the second user input in the first image frame. For example, when receiving the first user input and the second user input for different points of the preview image (for example, at least a portion of the first image frame) displayed on the display 340, the processor 330 may determine the first point corresponding to the location at which the first user input is received in the first image frame and determine the second point corresponding to the location at which the second user input is received in the first image frame.

According to an embodiment, in operation 409, the processor 330 may acquire a first video focused on a first subject corresponding to the first point through the first camera 310. According to an embodiment, in operation 411, the processor 330 may acquire a second video focused on a second subject corresponding to the second point through the second camera 320. It may be understood that operation 409 and operation 411 of FIG. 4 are performed in parallel rather than sequentially performed. For example, the processor 330 may also acquire the second video during a time interval in which the first video is acquired by activating both the first camera 310 and the second camera 320.

According to an embodiment, the processor 330 may store the first video and the second video in the memory 360. For example, the processor 330 may store the first video and the second video in the memory 360 as separate files. In another embodiment, the processor 330 may store the second video along with the first video in the memory 360 as metadata for the first video.

According to an embodiment, the processor 330 may drive at least one of the calibration module 376 and the resolution improvement module 377 while the second video is acquired in operation 411. For example, the processor 330 may acquire a plurality of image frames which are focused on the second subject through the second camera 320 and correspond to the second FOV, crop areas corresponding to the first FOV in the plurality of image frames, and may acquire the second video based on the cropped areas. The processor 330 may upscale the cropped areas to acquire the second video based on the areas having the improved resolution. For example, the processor 330 may perform the upscale for improving the resolution of the cropped areas and may acquire the second video based on the up-scaled areas.

According to an embodiment of the disclosure, the electronic device 101 may include a plurality of cameras (for example, the first camera 310 and the second camera 320) and capture multi-focus images (for example, the first video and the second video) focused on different subjects through the plurality of cameras. For example, the electronic device 101 according to the disclosure may acquire the first video focused on the first subject through the first camera 310 and also acquire the second video focused on the second subject through the second camera 320. Accordingly, even when the user captures the first video focused on the first subject through the electronic device 101 according to the disclosure, the second video focused on the second subject may also be stored. After capturing the first video, the user may replace the file with the second video focused on another subject (for example, the second subject) and generates a new video file based on at least a portion of the first video and at least a portion of the second video.

Figure 5:
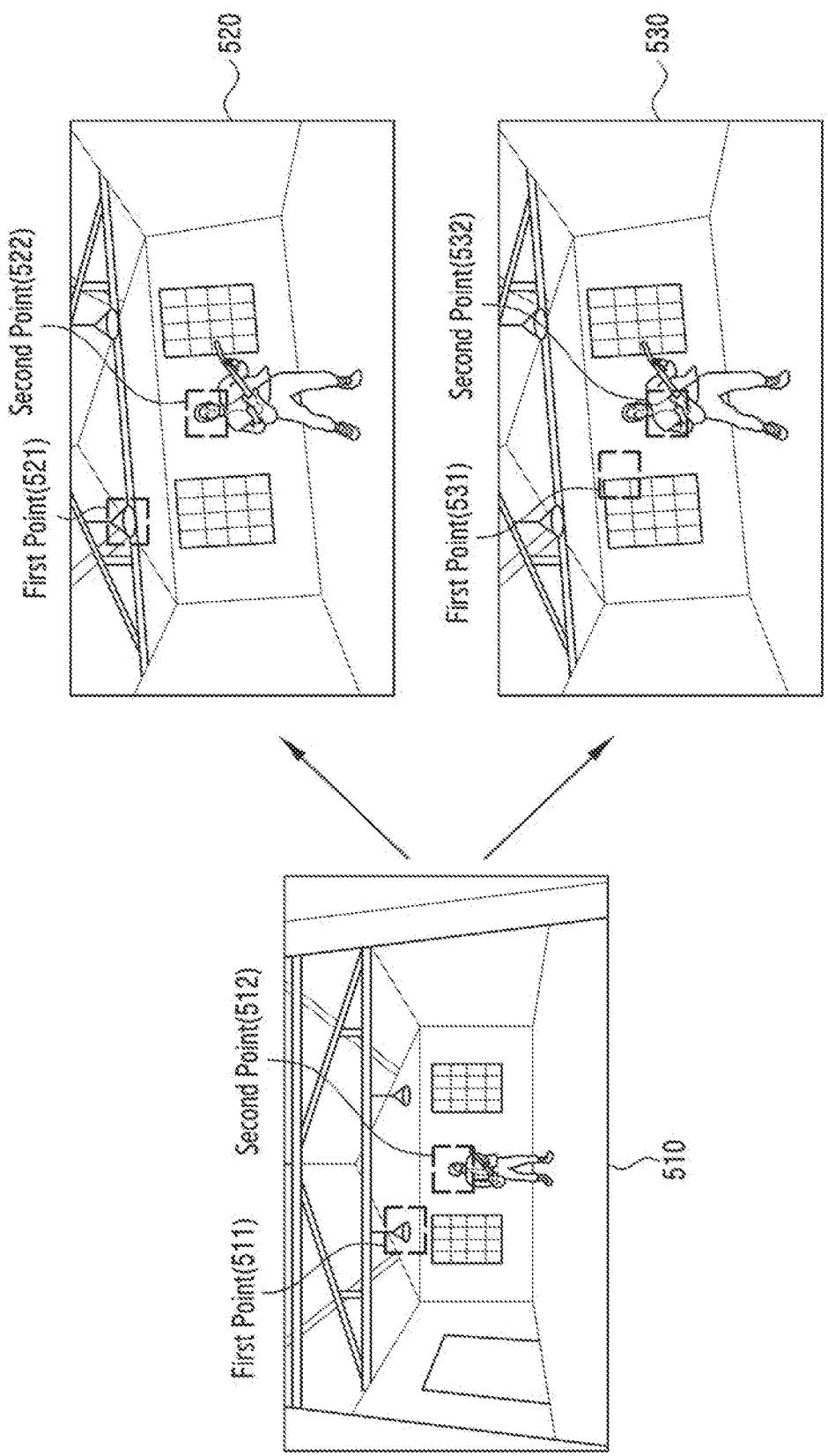
FIG. 5 illustrates an example in which the electronic device differently determines characteristics of a first point and a second point according to a duration time of a user input according to an embodiment.

FIG. 5 illustrates an example in which the electronic device 101 differently determines characteristics of the first point and the second point according to a duration time of a user input. It may be understood that operations illustrated in FIG. 5 are performed by the processor 330 of FIG. 3A and the processor 330 performs the same by driving an operation of the user input processing module 371 of FIG. 3B. It may be understood that some operations described in connection with FIG. 5 are performed by driving an operation of the object recognition and tracking module 372 of FIG. 3B.

According to an embodiment, the processor 330 may acquire a first image frame 510 through the first camera 310. The processor 330 may display the first image frame 510 on the display 340 as a preview. The processor 330 may receive a first user input and a second user input through the display 340.

Referring to FIG. 5, the processor 330 may determine a first point 511 corresponding to the first user input and a second point 512 corresponding to the second user input in the first image frame 510. For example, the processor 330 may acquire the first user input and the second user input corresponding to different points of the first image frame 510 through the display 340 and determine the first point 511 corresponding to the location at which the first user input is received in the first image frame 510 and the second point 512 corresponding to the location at which the second user input is received. For example, the first user input and the second user input may be determined according to the order in which the processor 330 receives the user inputs through the display 340. In another example, the processor 330 may output a user interface (UI) including information for selecting the first user input or the second input in response to a reception of a user touch input and distinguish between the first user input and the second user input according to the a user selection result for the UI.

According to an embodiment, the processor 330 (or the user input processing module 371) may determine characteristics of the first point 511 and the second point 512 according to a touch duration time of the user input (for example, the first user input and the second user input). For example, the processor 330 may determine the first point 511 and the second point 512 based on the location of the subject according to the touch direction time of the user input and determine the first point 511 and the second point 512 based on the location on the image frame (for example, the first image frame 510). According to an embodiment, the first point 521 and the second point 522 may be determined within the image frame 520 based on the location of the subject when the touch duration time of the user input (for example, the first user input or the second user input) is shorter than a threshold time, and the first point 531 and the second point 532 may be determined within the image frame 530 based on the location on the first image frame 510 when the touch duration time of the user input is longer than or equal to the threshold time. However, it is only an example, and the first point 521 or 531 and the second point 522 or 532 may be determined based on the location of the subject when the touch duration time of the user input is longer than or equal to the threshold time and determined based on the location on the image frame when the touch duration time of the user input is shorter than the threshold time.

Referring to FIG. 5, the processor 330 may determine that the first point 521 and the second point are within the image frame 520 after the first image frame 510 based on the location of the subject in response to satisfaction of a predetermined condition by the touch duration time of the user input (for example, the first user input or the second user input). For example, the processor 330 may identify a first subject corresponding to the first point 511 within the first image frame 510 and determine the first point 521 based on the location of the first subject within the image frame 520 after the first image frame 510 in response to a reception of the first user input of which the touch duration time is shorter than the threshold time. Further, the processor 330 may identify a second subject corresponding to the second point 512 within the first image frame 510 and determine the second point 522 based on the location of the second subject within the image frame 520 after the first image frame 510 in response to a reception of the second user input of which the touch duration time is shorter than the threshold time.

According to an embodiment, the processor 330 may determine the first point 521 and the second point 522 within the image frame 520 by driving an operation of the object recognition and tracking module 372 of FIG. 3B. For example, the object recognition and tracking module 372 may include an image patch tracking module. The image patch tracking module may extract feature points included in a predetermined range based on the first point 511 (or the second point 512) within the first image frame 510 and identify a point having a level of similarity that is larger than or equal to a threshold value with the feature points within the image frame 520 after the first image frame 510, so as to determine the first point 521 (or the second point 522). The processor 330 may extract feature points from surrounding areas of the first point 511 (or the second point 512) within the first image frame 510 and determine the first point 521 (or the second point 522) having a level of similarity that is larger than or equal to a predetermined level with the feature points within the image frame 520 after the first image frame 510.

Referring to FIG. 5, the processor 330 may determine the first point 531 and the second point 532 within the image frame 530 after the first image frame 510 on the basis of the location of the first point 511 and the location of the second point 512 in the first image frame 510 in response to satisfaction of a predetermined condition by the touch duration time of the user input (for example, the first user input or the second user input). For example, the processor 330 may identify the location (for example, coordinate) of the first point 511 within the first image frame 510 and determine the first point 531 based on the location (for example, coordinate) within the image frame 530 after the first image frame 510 in response to a reception of the first user input of which the touch duration time is longer than or equal to a threshold time. Further, the processor 330 may identify the location (for example, coordinate) of the second point 512 within the first image frame 510 and determine the second point 532 based on the location within the image frame 530 after the first image frame 510 in response to a reception of the second user input of which the touch duration time is longer than or equal to the threshold time.

According to an embodiment, when the first point 511, 521, or 531 and the second point 512, 522, or 532 are determined through the operations described with reference to FIG. 5, the processor 330 may acquire a first video focused on the first subject corresponding to the first point through the first camera 310 and may acquire a second video focused on the second subject corresponding to the second point through the second camera 320. For example, the processor 330 may control the first camera 310 to focus on the first subject by performing the AF function and control the second camera 320 to focus on the second subject by performing the AF function.

Figure 6:
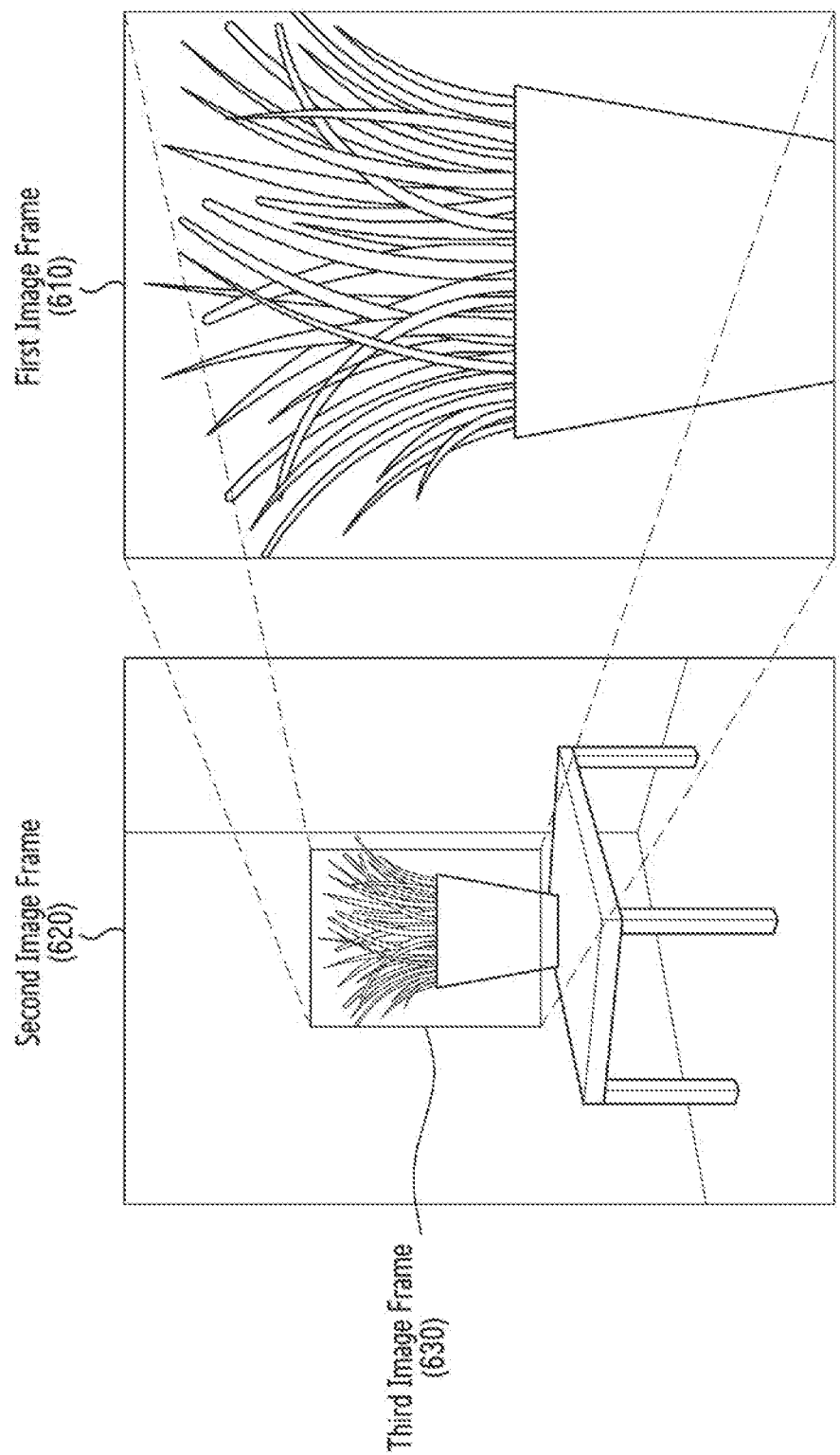
FIG. 6 illustrates an example in which the electronic device calibrates an image frame when FOVs of a first camera and a second camera are different according to an embodiment.

FIG. 6 illustrates an example in which the electronic device 101 calibrates an image frame according to an embodiment when FOVs of the first camera 310 and the second camera 320 are different. The operations described in FIG. 6 may be performed by the processor 330 illustrated in FIG. 3A or may be performed as the processor 330 drives at least one of the calibration module 376 or the resolution improvement module 377 of FIG. 3B.

According to an embodiment, the first FOV of the first camera 310 may be included in the second FOV of the second camera 320. For example, the first camera 310 may be a normal camera, and the second camera 320 may be an optical camera. In another example, the first camera 310 may be a telecamera, and the second camera 320 may be an optical camera.

Referring to FIG. 6, the processor 330 may acquire a first image frame 610 corresponding to the first FOV through the first camera 310. Further, the processor 330 may acquire a second image frame 620 corresponding to the second FOV through the second camera 320.

According to an embodiment, the processor 330 may acquire a third image frame 630 corresponding to the first FOV by cropping a portion of the second image frame 620. For example, the processor 330 may identify an area corresponding to the first image frame 610 within the second image frame 620 based on an image matching algorithm. The image matching algorithm may include at least one of scale invariant feature transform (SIFT), speeded up robust features (SURF), and binary robust independent elementary features (BRIEF). In addition, the image matching algorithm may use various schemes.

According to an embodiment, the first image frame 610, the second image frame 620, and the third image frame 630 illustrated in FIG. 6 may be image frames used to determine the first point and the second point that are focus reference points. According to an embodiment, the processor 330 may determine that a third point corresponding to the second point is within the third image frame 630 in response to a determination of the second point being within the first image frame 610 in connection with operation 407 of FIG. 4. According to an embodiment, the processor 330 may acquire a second video focused on the second subject corresponding to the third point through the second camera 320.

According to an embodiment, the first image frame 610 illustrated in FIG. 6 may be one of a plurality of image frames included in the first video acquired by the processor 330 through the first camera 310, and the second image frame 620 and the third image frame 630 may be one of a plurality of image frames related to the second video acquired through the second camera 320. For example, the processor 330 may acquire the first image frame 610 focused on the first subject through the first camera 310 and may acquire the first video at least including the first image frame 610. In another example, the processor 330 may acquire the second image frame 620 which is focused on the second subject through the second camera 320 and corresponds to the second FOV, may acquire the third image frame 630 corresponding to the first FOV by cropping a portion of the second image frame 620, and may acquire the second video at least including the third image frame 630.

According to an embodiment, the processor 330 may calibrate at least one of the first image frame 610 or the second image frame 620 to compensate for a difference between the first camera 310 and the second camera 320. The processor 330 may calibrate at least one of the first image frame 610 or the second image frame 620 by driving an operation of the calibration module 376 while the application 370 is executed. According to an embodiment, the processor 330 may acquire the third image frame 630 corresponding to the first image frame 610 by performing at least one of lens distortion calibration, white balance calibration, or aperture value calibration for the second image frame 620. The first video including the first image frame 610 and the second video including the third image frame 630 may have no difference therebetween or so little difference that the difference can be ignored, and the user may perform various video edit functions using natural screen transitions between the first video and the second video.

According to an embodiment, the processor 330 may acquire the second video based on the third image frame 630 having the improved resolution by upscaling the third image frame 630. The processor 330 may increase the resolution of the third image frame 630 by driving an operation of the resolution improvement module 377 while the application 370 is executed. For example, the third image frame 630 is acquired by cropping the portion of the second image frame 620 and thus may have a resolution lower than that of the first image frame 610, and accordingly, the processor 330 may improve the resolution of the third image frame 630.

According to an embodiment, the processor 330 may upscale the third image frame 630 based on a deep learning model for improving the resolution. According to an embodiment, the processor 330 may improve a quality of the upscaled third image frame 630 by using the first image frame 610 as a guide image.

Figure 7:
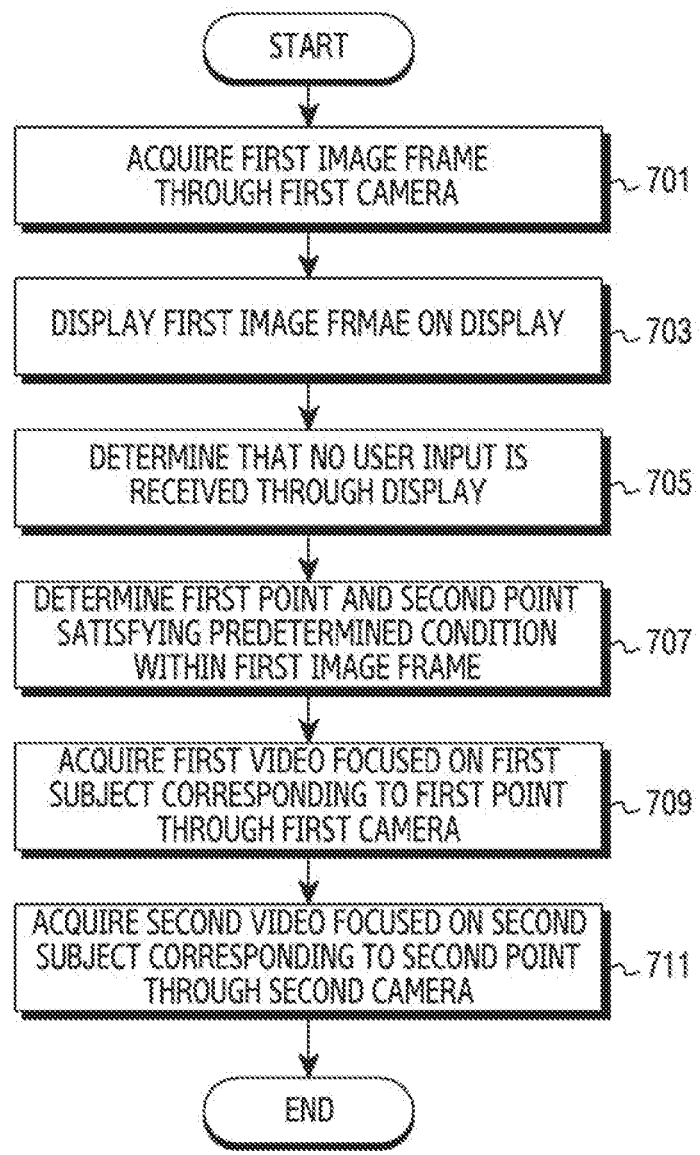
FIG. 7 is a flowchart illustrating the flow of an operation in which the electronic device acquires a first video and a second video when no user input is received according to an embodiment.

FIG. 7 is a flowchart illustrating the flow of an operation in which the electronic device 101 acquires a first video and a second video when a user input is not received according to an embodiment. Operations illustrated in FIG. 7 may be performed by the processor 330 of FIG. 3A. It may be understood that the operations illustrated in FIG. 7 are performed as the processor 330 at least drives the object recognition and tracking module 372, the importance determination module 373, and the focus reference point calculation module 375 illustrated in FIG. 3B.

According to an embodiment, in operation 701, the processor 330 may acquire a first image frame through the first camera 310. Operation 701 may correspond to operation 401 of FIG. 4.

According to an embodiment, in operation 703, the processor 330 may display the first image frame on the display 340 as a preview. Operation 703 may correspond to operation 403 of FIG. 4.

According to an embodiment, in operation 705, the processor 330 may determine that no user input is received through the display 340. For example, the processor 330 may determine that no touch input for one point of the first image frame is received while a preview image is displayed.

According to an embodiment, in operation 707, the processor 330 may determine a first point and a second point that satisfy a predetermined condition within the first image frame. According to an embodiment, the processor 330 may determine the first point and the second point by driving at least one of the object recognition and tracking module 372, the importance determination module 373, or the gaze information acquisition module 374. The operation for determining the first point and the second point is described below with reference to FIGS. 8 to 10.

According to an embodiment, in operation 709, the processor 330 may acquire a first video focused on a first subject corresponding to the first point through the first camera 310. According to an embodiment, in operation 711, the processor 330 may acquire a second video focused on a second subject corresponding to the second point through the second camera 320. Operation 709 and operation 711 of FIG. 7 may correspond to operation 409 and operation 411 of FIG. 4.

Figure 8:
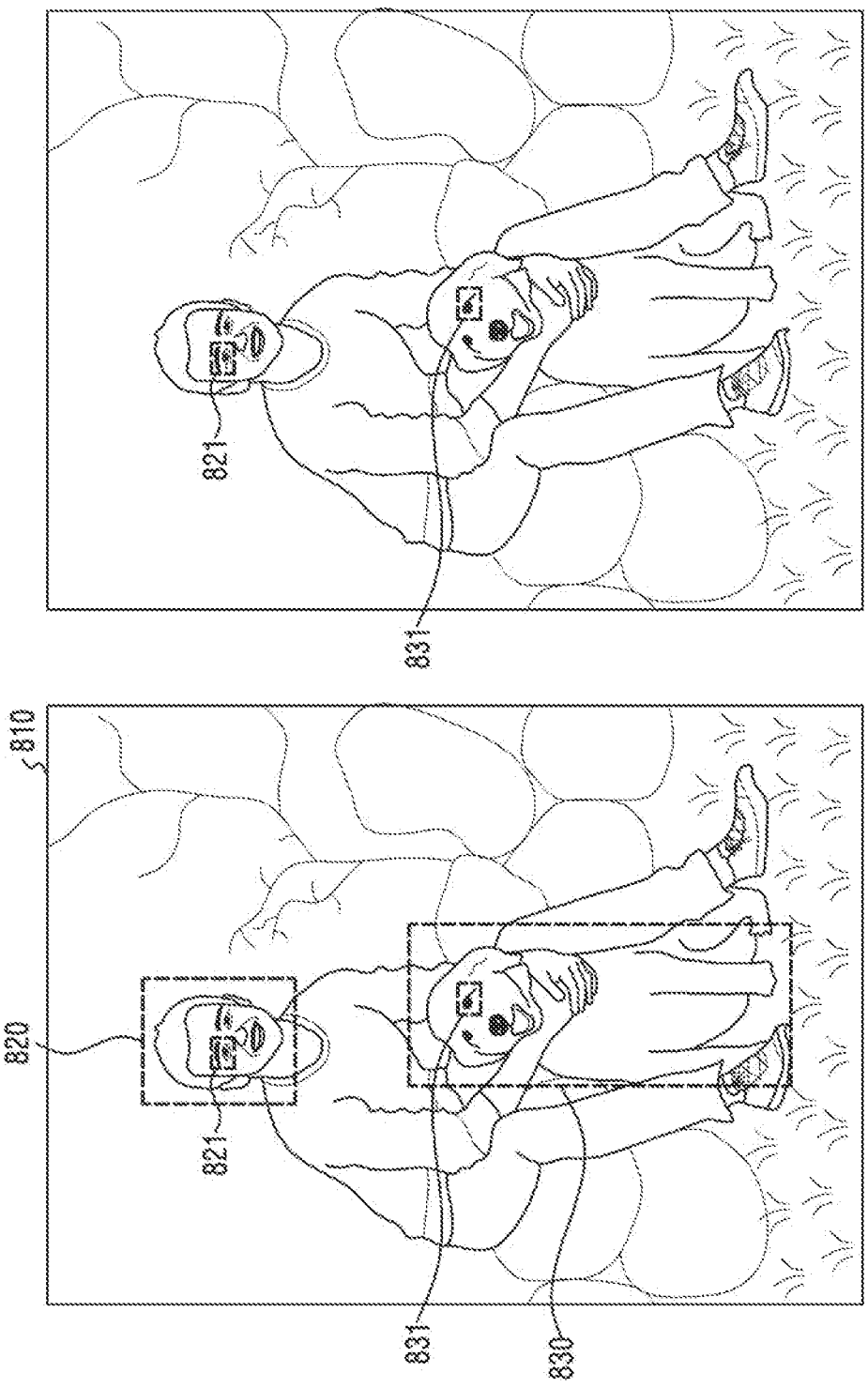
FIG. 8 illustrates an example in which the electronic device determines whether a predetermined type of an object is included in an image frame according to an embodiment.

FIG. 8 illustrates an example in which the electronic device 101 determines whether a predetermined type of an object is included in an image frame according to an embodiment. It may be understood that operations illustrated in FIG. 8 are performed by the processor 330 illustrated in FIG. 3A or performed as the processor 330 drives an operation of the object recognition and tracking module 372 illustrated in FIG. 3B.

According to an embodiment, the processor 330 may acquire a first image frame 810 through the first camera 310. The processor 330 may output at least a portion of the first image frame 810 as a preview through the display 340.

According to an embodiment, the processor 330 may determine a first point and a second point that satisfy a predetermined condition within the first image frame 810 by driving an operation of the object recognition and tracking module 372 in response to a determination that no user input through the display 340 is received. For example, the processor 330 may determine whether the predetermined type of the object is included in the first image frame 810 and may determine that the first point and the second point corresponding to the object in response to a determination that the predetermined type of the object is included in the first image frame 810.

According to an embodiment, the processor 330 may determine whether subjects included in the first image frame 810 include at least one of a human face, human eyes, animal eyes, or an animal body. For example, the object recognition and tracking module 372 may include a lower module for recognizing a human face, a lower module for recognizing human eyes, a lower module for recognizing an animal body, and a module for recognizing animal eyes. According to an embodiment, the processor 330 may determine whether an object corresponding to a keyword input by the user is included in the first image frame 810. For example, the object recognition and tracking module 372 may further include a lower module for recognizing a universal object. According to another embodiment, the processor 330 may recognize and track a subject located closest to the electronic device 101 based on output data of the depth sensor.

Referring to FIG. 8, the processor 330 may determine whether a human face is included in the first image frame 810 and may acquire a first area 820 corresponding to the location of the human face. For example, the processor 330 may determine that the human face is included in the first area 820 within the first image frame 810 by driving a module for recognizing the human face, which is a lower module of the object recognition and tracking module 372, while the application 370 is executed.

Referring to FIG. 8, when it is determined that the human face is included in the first area 820 within the first image frame 810, the processor 330 may determine whether human eyes are included in the first area 820 and may acquire a second area 821 corresponding to the location of the human eyes. For example, the processor 330 may determine that the human eyes are included in the second area 821 within the first area 820 by driving a module for recognizing the human eyes, which is a lower module of the object recognition and tracking module 372 while the application 370 is executed.

Referring to FIG. 8, the processor 330 may determine whether an animal body is included in the first image frame 810 and may acquire a third area 830 corresponding to the animal body. For example, the processor 330 may determine that the animal body is included in the third area 830 within the first image frame 810 by driving a module for recognizing the animal body which is a lower module of the object recognition and tracking module 372 while the application 370 is executed.

Referring to FIG. 8, when it is determined that the animal body is included in the third area 830 within the first image frame 810, the processor 330 may determine whether animal eyes is included in the third area 830 and may acquire a fourth area 831 corresponding to the location of the animal eyes. For example, the processor 330 may determine that the animal eyes is included in the fourth area 831 within the third area 830 by driving a module for recognizing the animal eyes which is a lower module of the object recognition and tracking module 372 while the application 370 is executed.

According to an embodiment, the processor 330 may acquire the result of some lower modules among the lower modules of the object recognition and tracking module 372 and then drive other lower modules based on the result. For example, when acquiring the first area 820 corresponding to the location of the human face within the first image frame 810, the processor 330 may acquire the second area 821 corresponding to the location of the human eyes within the first area 820. The processor 330 may determine whether the human eyes are included in the first area 820 and may not determine whether the human eyes are included in the outside of the first area 820.

According to an embodiment, when acquiring the second area 821 and the fourth area 831, the processor 330 may determine one point of the second area 821 and one point of the fourth area 831 as focus reference point candidates. For example, when the second area 821 corresponding to the location of the human eyes is identified within the first area 820 corresponding to the human face, the processor 330 may exclude the first area 820 from the focus reference point candidates and determine the second area 821 as the focus reference point candidate. Further, when the fourth area 831 corresponding to the location of the animal eyes is identified within the third area 830 corresponding to the animal body, the processor 330 may exclude the third area 830 from the focus reference point candidates and determine the fourth area 831 as the focus reference point candidate.

According to an embodiment, the processor 330 may determine a first point and a second point according to a predetermined priority among one point of the second area 821 and one point of the fourth area 831. For example, when the priority of the human eyes is higher than the priority of the animal eyes, the processor 330 may determine one point of the second area 821 corresponding to the location of the human eyes as the first point and determine one point of the fourth area 831 corresponding to the location of the animal eyes as the second point. In addition, the predetermined priority may be variously configured and may be changed according to user settings. According to an embodiment, the processor 330 may acquire three or more focus reference point candidates unlike FIG. 8, and the first point and the second point may be determined according to a predetermined priority among the three or more focus reference point candidates.

Although it has been described that the processor 330 determines the first point and the second point that satisfy the predetermined condition within the first image frame 810 acquired through the first camera 310 with reference to FIG. 8, the processor 330 may determine that the first point and the second point are within the second image frame acquired through the second camera 320 in another embodiment. According to an embodiment, the object recognition and tracking module 372 may perform an operation of recognizing a predetermined type of an object within the image frame and an operation of tracking the recognized object. For example, the processor 330 may recognize the predetermined type of the object by driving a module for recognizing a human face (or human eyes, an animal body, animal eyes, or the like) among the lower modules of the object recognition and tracking module 372 and track the object by driving an image patch tracking module (see FIG. 5) among the lower modules of the object recognition and tracking module 372. According to an embodiment, time required for performing calculations to track the object by the object recognition and tracking module 372 may be shorter than time required for performing calculations to recognize the object. Accordingly, in the state in which the predetermined type of the object escapes the first FOV of the first camera 310 and then enters back the first FOV, the calculation time may be reduced as the processor 330 recognizes and tracks the predetermined type of the object based on the second image frame corresponding to the second FOV wider than the first FOV. According to an embodiment, when the object escapes the first FOV while the processor 330 recognizes and tracks the predetermined type of the object included in the first image frame 810, the processor may recognize and track the predetermined type of the object based on the second image frame.

Figure 9:
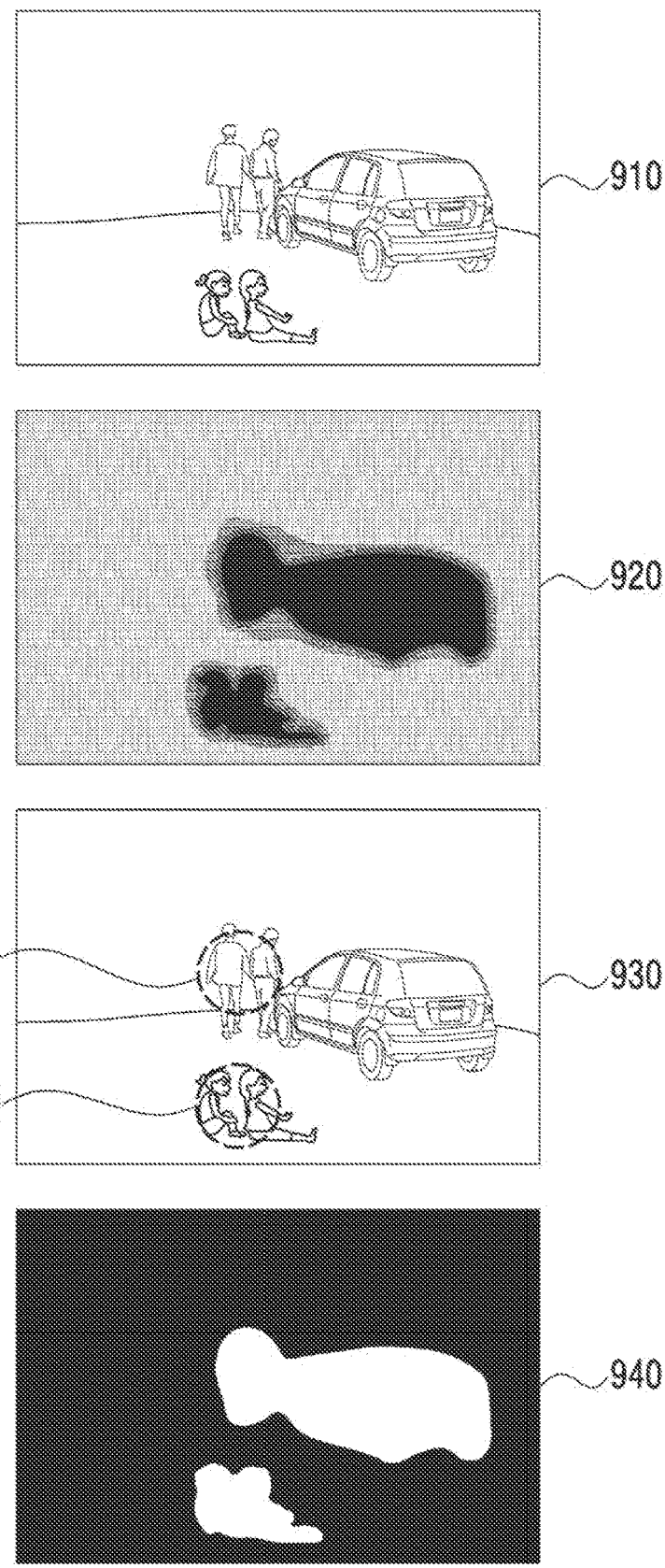
FIG. 9 illustrates an example in which the electronic device determines importance of at least one subject included in an image frame according to an embodiment.

FIG. 9 illustrates an example in which the electronic device 101 determines an importance of at least one subject included in the image frame according to an embodiment. It may be understood that operations illustrated in FIG. 9 are performed by the processor 330 of FIG. 3A or performed as the processor 330 drives an operation of the importance determination module 373 illustrated in FIG. 3B. According to an embodiment, the processor 330 may acquire a first image frame 910 through the first camera 310. According to an embodiment, the processor 330 may determine an importance 920 of at least one subject included in the first image frame 910. In another embodiment, the processor 330 may determine an importance of at least one subject included in the second image frame acquired through the second camera 320, and the description of FIG. 9 may be applied to importance related to the second image frame.

According to an embodiment, the processor 330 may determine an importance 920 of at least one subject included in the first image frame 910. The processor 330 may determine an importance 920 corresponding to the first image frame 910 by driving an operation of the importance determination module 373 while the application 370 is executed. According to an embodiment, the processor 330 may acquire importance 920 corresponding to the first image frame 910 through a machine learning model or a deep learning model. For example, the processor 330 may acquire an importance level (or a saliency level) of each point included in the first image frame 910 through the machine learning model or the deep learning model.

Referring to reference numeral 930 of FIG. 9, the processor 330 may determine a first point 931 and a second point 932 based on the importance 920 of the first image frame 910. According to an embodiment, the processor 330 may identify a subject having importance 920 being higher than or equal to a predetermined value within the first image frame 910 and determine one point (for example, the central point or a point having the highest importance within the corresponding area) of the area corresponding to the subject having the importance 920 being higher than or equal to the predetermined value as the first point 931 or the second point 932. For example, the processor 330 may acquire an area corresponding to the subject having the importance 920 being higher than or equal to the predetermined value through connected component analysis. According to an embodiment, the processor 330 may determine two focus reference point candidates in two areas corresponding to the subject having the importance 920 being higher than or equal to the predetermined value based on the importance 920 of the first image frame 910 and may determine a point having the higher importance 920 among the focus reference point candidates as the first point 931 and the remaining point among the focus reference point candidates as the second point 932.

According to an embodiment, the processor 330 may acquire data 940 related to importance by dividing the importance 920 of the first image frame 910 based on a threshold value. For example, the data 940 related to the importance may be divided into a white area having the importance 920 being higher than or equal to the threshold value and a black area having the importance 920 that is lower than the threshold value. According to an embodiment, the processor 330 may not determine a focus reference point candidate included in the area having the importance 920 that is lower than the threshold value as the first point or the second point among the focus reference point candidate according to the user input described with reference to FIG. 5, the focus reference point candidate according to object recognition and tracking described with reference to FIG. 8, or the focus reference point candidate included in the area having the importance 920 that is lower than the threshold value based on the data 940 related to the importance. However, it is only an example, and even the focus reference point candidate included in the area having the importance 920 that is lower than the threshold value may be determined as the first point or the second point according to a predetermined priority.

Figure 10:
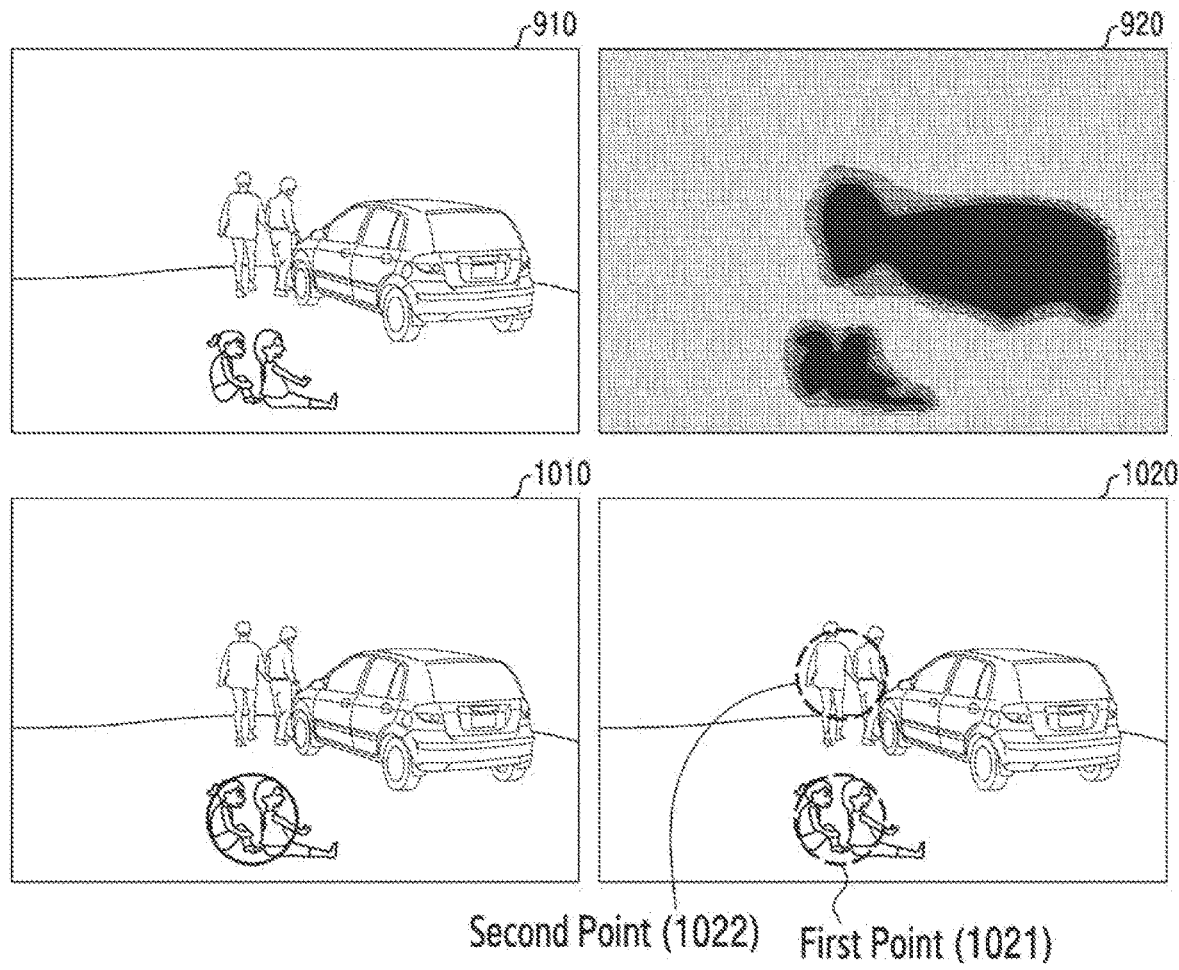
FIG. 10 illustrates an example in which the electronic device uses user gaze information along with importance according to an embodiment.

FIG. 10 illustrates an example in which the electronic device 101 uses a user's gaze information along with importance according to an embodiment. It may be understood that operations illustrated in FIG. 10 is performed by the processor 330 of FIG. 3A or performed as the processor 330 drives an operation of the importance determination module 373 and the gaze information acquisition module 374 of FIG. 3B.

According to an embodiment, the first image frame 910 of FIG. 10 and the importance 920 of at least one subject included in the first image frame 910 may correspond to the first image frame 910 and the importance 920 illustrated in FIG. 9.

According to an embodiment, the processor 330 may include the first camera 310 and the second camera 320 disposed on the electronic device 101 to face a first direction (for example, rear surface) and further include a third camera 350 disposed on the electronic device 101 to face a second direction (for example, front surface) different from the first direction. According to an embodiment, the processor 330 may acquire gaze information 1010 corresponding to the location where the user's eyes are directed on the display 340 through the third camera 350 while a preview image is displayed on the display 340. The processor 330 may acquire the gaze information 1010 by driving an operation of the gaze information acquisition module 374 while the application 370 is executed. For example, the processor 330 may capture a user's face through the third camera 350 and may acquire the gaze information 1010 for the location where the user's eyes are directed through image analysis of the user's pupils. According to an embodiment, the processor 330 may acquire the gaze information 1010 through pre-learned machine learning model or deep learning model. The processor 330 may determine the location where the user's eyes are directed on the display 340 or a virtual plane including the display 340 through the third camera 350.

FIG. 10 illustrates that the gaze information 1010 is an image which is the same as the first image frame 910, but it is only for convenience of description, and the gaze information 1010 may include information (for example, coordinate information) on the location where the user's eyes are directed on the first image frame 910 or may not include image data such as a pixel value or the like.

According to an embodiment, before acquiring focus reference point candidates within the first image frame 910 based on the gaze information 1010, the processor 330 may perform a calibration operation for reducing a difference between the location actually viewed by the user and the gaze information 1010 acquired by the processor 330 using the third camera 350. For example, the processor 330 may increase an accuracy of determining the location where the user's eyes are directed through a UI making a request for watching a specific point of the display 340.

Referring to reference numeral 1020 of FIG. 10, the processor 330 may determine a first point 1021 and a second point 1022 based on the importance 920 within the first image frame 910 and the gaze information 1010. For example, the processor 330 may determine two focus reference point candidates based on the importance 920, and determine a point corresponding to the gaze information 1010 among the two focus reference point candidates as the first point 1021 and the remaining point as the second point 1022. In another example, the processor 330 may determine the first point 1021 based on the gaze information 1010 and determine a point that does not overlap the first point 1021 among the focus reference point candidates acquired based on the importance 920 as the second point 1022.

Figure 11:
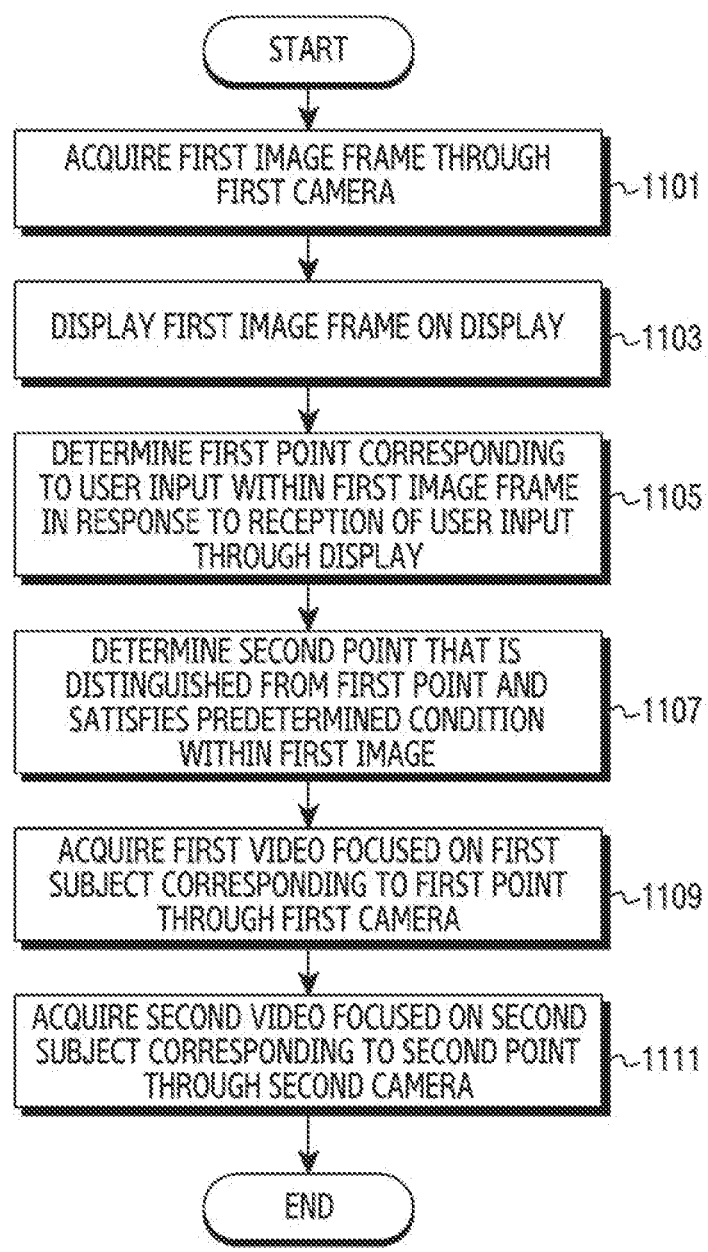
FIG. 11 is a flowchart illustrating the flow of an operation in which the electronic device acquires a first video according to a user input and a second video based on a predetermined condition according to an embodiment.

FIG. 11 is a flowchart illustrating the flow of an operation in which the electronic device 101 acquires a first video according to a user input and a second video based on a predetermined condition according to an embodiment. Operations illustrated in FIG. 11 may be performed by the processor 330 of FIG. 3A.

According to an embodiment, in operation 1101, the processor 330 may acquire a first image frame through the first camera 310. Operation 1101 may correspond to operation 401 of FIG. 4 or operation 701 of FIG. 7.

According to an embodiment, in operation 1103, the processor 330 may display the first image frame on the display 340 as a preview. Operation 1103 may correspond to operation 403 of FIG. 4 or operation 703 of FIG. 7.

According to an embodiment, in operation 1105, the processor 330 may determine a first point corresponding to a user input within a first image frame in response to a reception of the user input through the display 340. For example, the user input may be a user touch input received one time for the display 340. The processor 330 may receive the user input while the first image frame is output as a preview and determine that the first point is within the first image frame based on the location at which the user input is received. According to an embodiment, the processor 330 may determine a characteristic of the first point based on a touch duration time of the user input in connection with the description made with reference to FIG. 5.

According to an embodiment, in operation 1107, the processor 330 may determine that a second point that is distinguished from the first point is within the first image frame and satisfies a predetermined condition. For example, the processor 330 may determine whether a predetermined type of an object is included in the first image frame and determine one point corresponding to a specific subject as the second point in response to a determination that the specific subject within the first image frame is the predetermined type of the object. The operations described in FIG. 8 may be performed for the predetermined type of the object. The operation for determining the second point is described below with reference to FIGS. 12 to 15.

According to an embodiment, in operation 1109, the processor 330 may acquire a first video focused on a first subject corresponding to the first point through the first camera 310. According to an embodiment, in operation 1111, the processor 330 may acquire a second video focused on a second subject corresponding to the second point through the second camera 320. Operations 1109 and 1111 of FIG. 11 may correspond to operations 409 and 411 of FIG. 4 or operations 709 and 711 of FIG. 7. It may be understood that operation 1109 and operation 1111 are performed in parallel.

According to an embodiment, in connection with operation 1103, the description of the touch duration time of the user input made with reference to FIG. 5 may be applied. Further, in connection with operation 1107, the description of recognition and tracking of the predetermined type of the object made with reference to FIG. 8, the description of importance made with reference to FIG. 9, and the description of gaze information made with reference to FIG. 10 may be applied. In addition, in connection with operation 1109 and operation 1111, the description of improvement of calibration and resolution made with reference to FIG. 6 may be applied.

Figure 12:
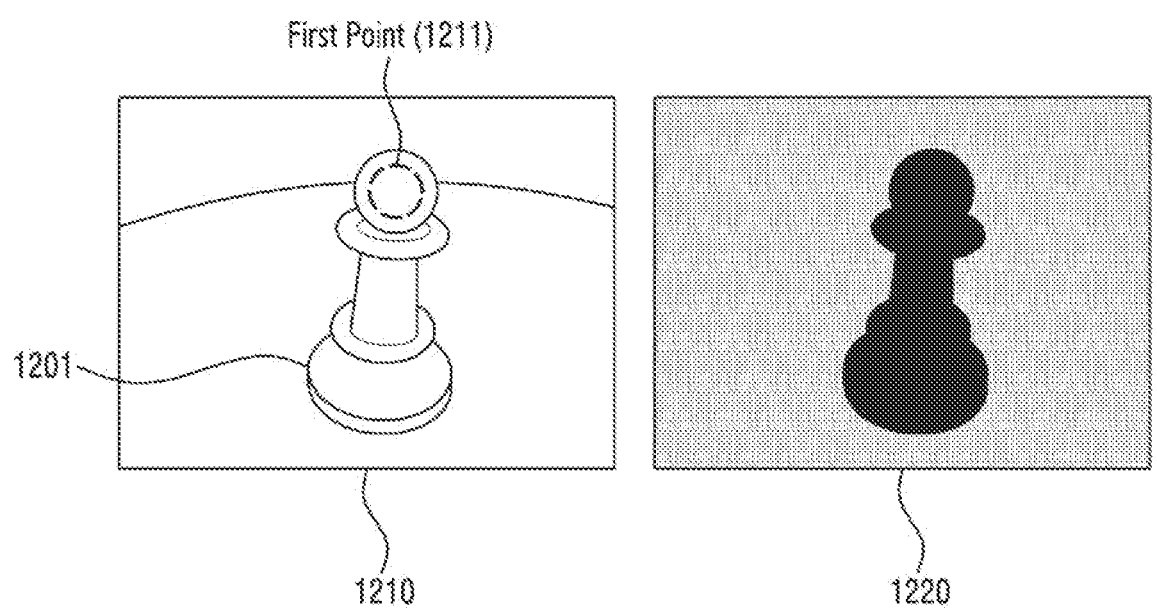
FIG. 12 illustrates an example in which the electronic device uses a user input and importance according to an embodiment.

FIG. 12 illustrates an example in which the electronic device 101 uses a user input and importance according to an embodiment. Operations described in FIG. 12 may be performed by the processor 330 of FIG. 3A or performed as the processor 330 drives an operation of the user input processing module 371 and an operation of the importance determination module 373 of FIG. 3B.

According to an embodiment, the processor 330 may acquire a first image frame 1210 through the first camera 310. The processor 330 may output a first image frame 1210 to the display 340 as a preview.

According to an embodiment, the processor 330 may receive a user input (for example, a user touch input) through the display 340 and determine a first point 1211 corresponding to the user input. The processor 330 may acquire information on the location at which the user input is received or a touch duration time by driving an operation of the user input processing module 371. For example, the processor 330 may receive a user input for one area among subjects 1201 located near the center of the first image frame 1210 and determine one point corresponding to the location at which the user input is received as a first point 1211 in response to a reception of the user input.

According to an embodiment, the processor 330 may determine an importance 1220 for at least one subject (for example, the subjects 1201) included in the first image frame 1210. For example, the processor 330 may identify the importance 1220 for the subjects included in the first image frame 1210 by driving an operation of the importance determination module 373.

According to an embodiment, the processor 330 may determine that the importance 1220 of the subjects 1201 within the first image frame 1210 is higher than or equal to a threshold value and the importance 1220 of areas other than the subjects 1201 is lower than the threshold value.

According to an embodiment, when the first point 1211 is determined within the subject 1201 having an importance being higher than or equal to a predetermined value within the first image frame 1210, a predetermined type of an object not recognized, and gaze information related to the location where the user's eyes are directed is not acquired, the processor 330 may determine that a second point distinguished from the first point 1211 cannot be determined within the first image frame 1210.

According to an embodiment, the processor 330 may acquire a second video focused on a preset point through the second camera 320 in response to a determination that the second point cannot be determined within the first image frame 1210. For example, the processor 330 may acquire the second video by changing the focus of the second camera 320 into the default focal distance. According to another embodiment, the processor 330 may not acquire the second video by deactivating the second camera 320 in response to a determination that the second point cannot be determined within the first image frame 1210.

Figure 13:
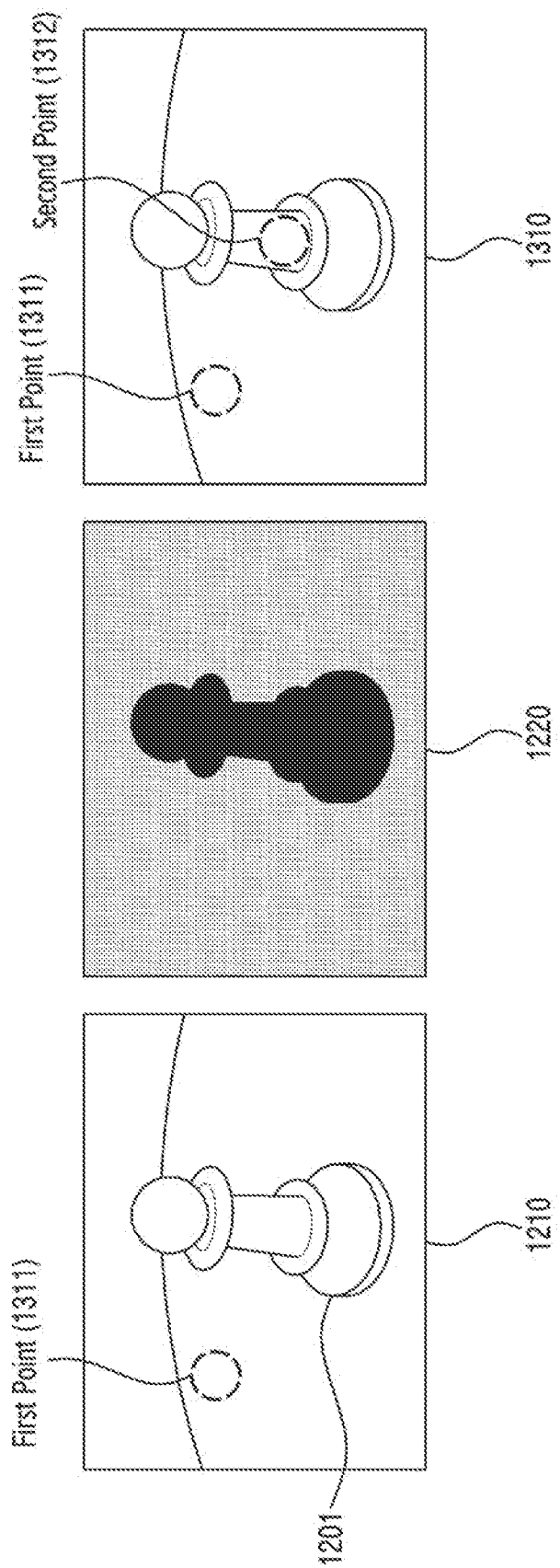
FIG. 13 illustrates an example in which the electronic device uses a user input and importance according to an embodiment.

FIG. 13 illustrates an example in which the electronic device 101 uses a user input and importance. Operations described in FIG. 13 may be performed by the processor 330 of FIG. 3A or performed as the processor 330 drives an operation of the user input processing module 371 and the importance determination module 373 of FIG. 3B.

According to an embodiment, the processor 330 may acquire a first image frame 1210 through the first camera 310. According to an embodiment, the processor 330 may display the first image frame 1210 on the display 340 as a preview.

According to an embodiment, the processor 330 may receive a user input through the display 340 and determine a first point 1311 corresponding to the user input in response to a reception of the user input. For example, the processor 330 may acquire a user input for one point in a background part which is not the subjects 1201 included near the center of the first image frame 1201 and determine the first point 1311 corresponding to the location at which the user input is received.

According to an embodiment, the processor 330 may determine an importance 1220 for at least one subject (for example, the subjects 1210) included in the first image frame 1210. The importance 1220 of FIG. 13 may correspond to the importance 1220 of FIG. 12. According to an embodiment, the processor 330 may determine a second point 1312 based on the importance for the first image frame 1210. For example, the processor 330 may identify the subjects 1201 having the importance 1220 being higher than or equal to a predetermined value within the first image frame 1210 and determine one point in areas corresponding to the subjects 1201 as a second point 1312. For example, the one point in the areas corresponding to the subjects 1201 may be the center point in the areas corresponding to the subjects 1201.

Referring to reference numeral 1310 of FIG. 13, the processor 330 may determine the second point 1312 that is distinguished from the first point 1311 within the first image frame 1210 and satisfies a predetermined condition. The predetermined condition in FIG. 13 may be understood as a condition related to the importance 1220.

Figure 14:
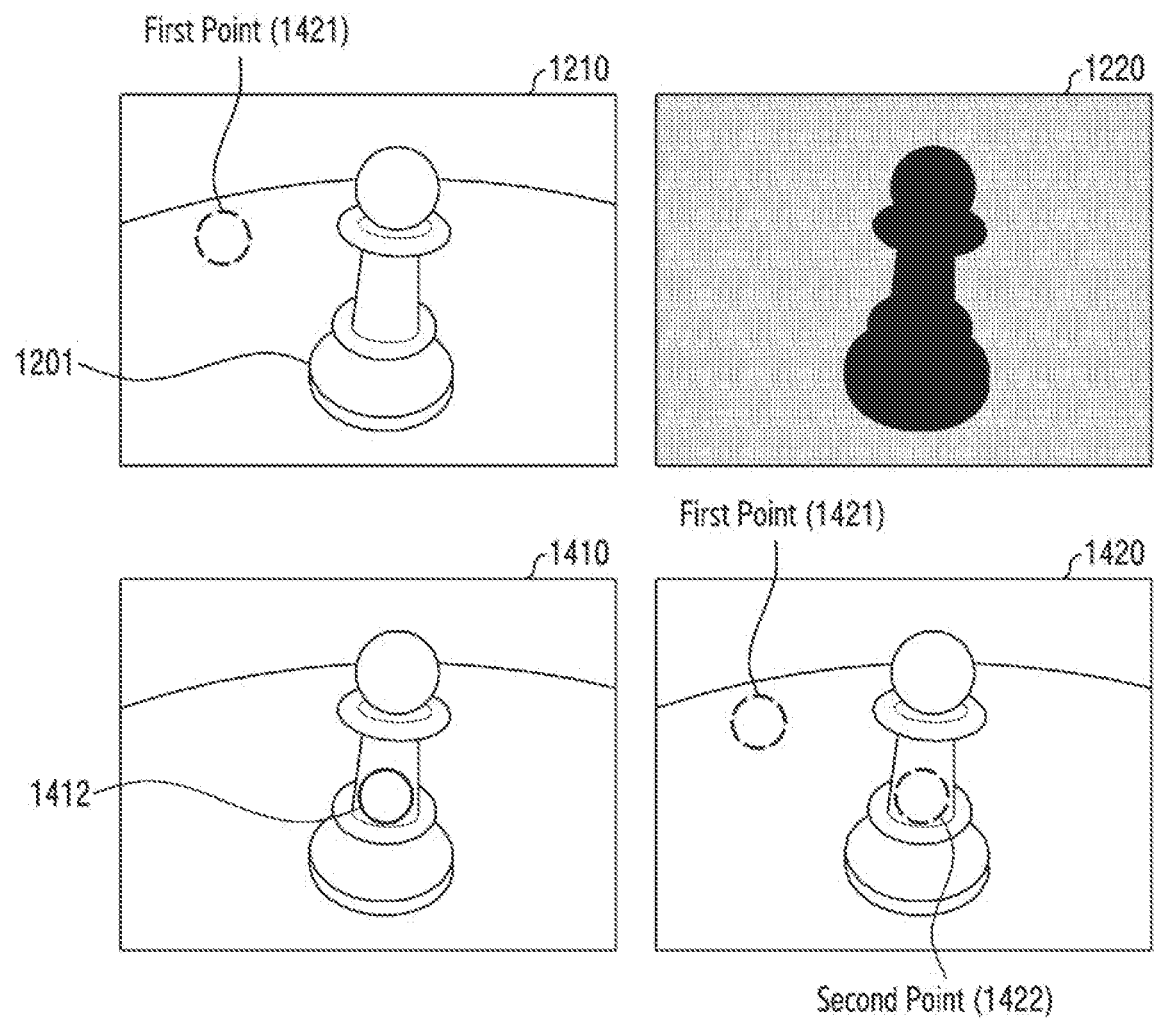
FIG. 14 illustrates an example in which the electronic device uses a user input, importance, and gaze information according to an embodiment.

FIG. 14 illustrates an example in which the electronic device 101 uses a user input, importance, and gaze information according to an embodiment. Operations described in FIG. 14 may be performed by the processor 330 of FIG. 3A or performed as the processor 330 drives an operation of the user input processing module 371, an operation of the importance determination module 373, and an operation of the gaze information acquisition module 374 of FIG. 3B.

According to an embodiment, the processor 330 may acquire the first image frame 1210 through the first camera 310 and determine a first point 1421 corresponding to a user input acquired through the display 340.

According to an embodiment, the processor 330 may determine an importance 1220 for at least one subject (for example, the subjects 1210) included in the first image frame 1210. The importance 1220 of FIG. 14 may correspond to the importance 1220 of FIG. 12 and the importance 1220 of FIG. 13.

According to an embodiment, the processor 330 may acquire gaze information 1410 for a location 1412 where the user's eyes are directed on the display 340 through the third camera 350.

According to an embodiment, the processor 330 may determine that a second point 1422 that is distinguished from the first point is within the first image frame 1210 and satisfies a predetermined condition. Referring to reference numeral 1420 of FIG. 14, the processor 330 may determine the second point 1422 within the first image frame 1210 based on the importance 1220 for at least one subject (for example, the subjects 1201) included in the first image frame 1210 and the gaze information 1422 within the first image frame 1210 based on the gaze information 1410 for the location 1412 where the user's eyes are directed on the display 340. For example, the processor 330 may identify subjects having importance 1220 being higher than or equal to a predetermined value to acquire an area corresponding to the subjects 1201 and determine the second point 1422 based on the location 1412 where the user's eyes are directed within the area corresponding to the subjects 1201. When the electronic device 101 determines the second point 1422 based on the importance 1220 and the gaze information 1410, the location at which the focus of the second video is configured may be set to fit a user's intention.

Figure 15:
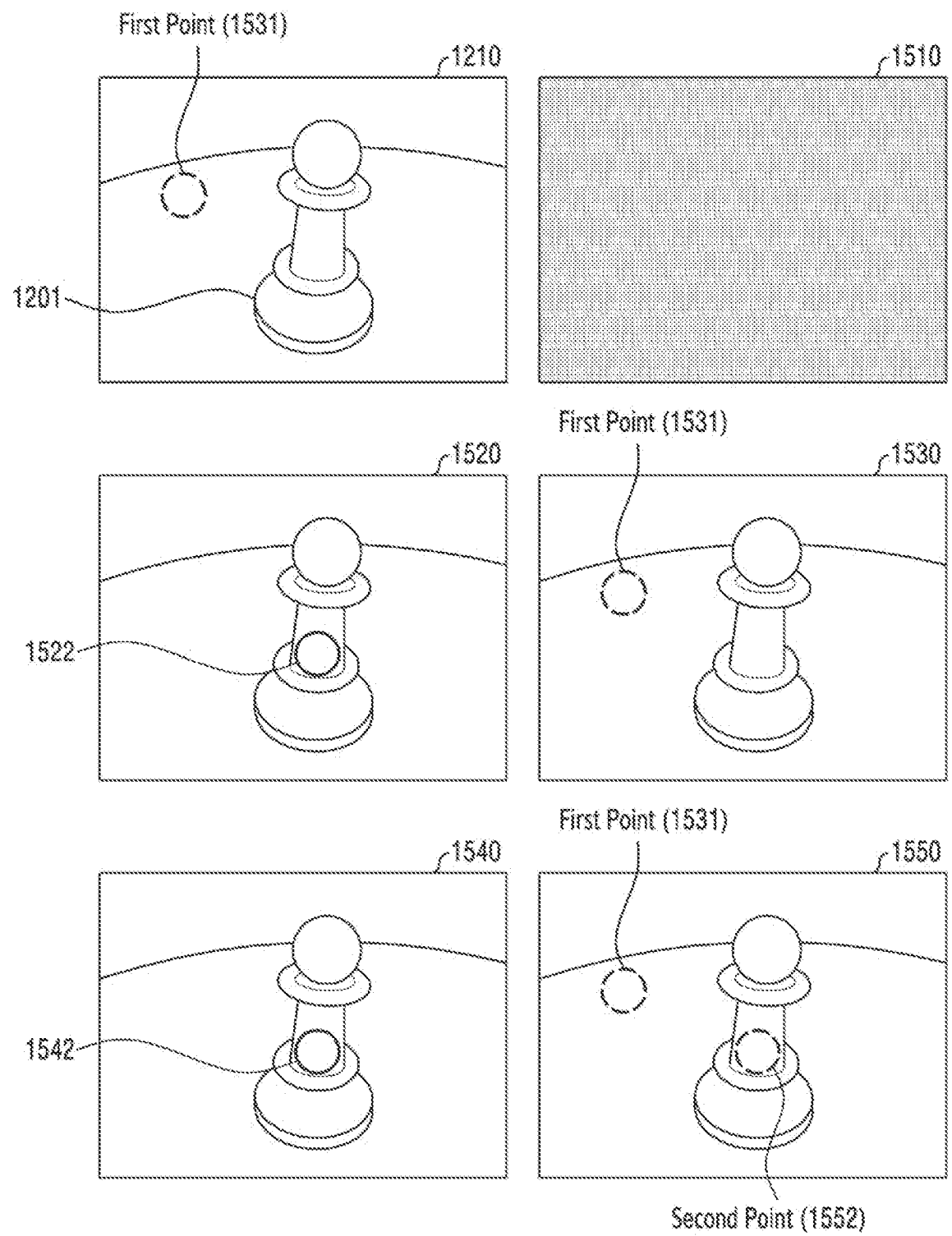
FIG. 15 illustrates an example in which the electronic device uses a user input, importance, and gaze information according to an embodiment.

FIG. 15 illustrates an example in which the electronic device 101 uses a user input, importance, and gaze information according to an embodiment. Operations described in FIG. 15 may be performed by the processor 330 of FIG. 3A or performed as the processor 330 drives an operation of the user input processing module 371, an operation of the importance determination module 373, and an operation of the gaze information acquisition module 374 of FIG. 3B.

According to an embodiment, the processor 330 may acquire the first image frame 1210 through the first camera 310 and determine a first point 1531 corresponding to a user input acquired through the display 340.

According to an embodiment, the processor 330 may determine an importance 1220 for at least one subject (for example, the subjects 1210) included in the first image frame 1510. For example, unlike in FIGS. 12 to 14, the processor 330 may determine that importance 1510 of the subjects 1201 included in the first image frame 1210 is not higher than a predetermined value in FIG. 15.

According to an embodiment, the processor 330 may acquire gaze information 1520 or 1540 for a location 1522 or 1542 where the user's eyes are directed on the display 340 through the third camera 350. According to an embodiment, the processor 330 may pre-configure reliability of the gaze information 1520 or 1540. The reliability of the gaze information 1520 or 1540 may be reliability pre-configured in the electronic device 101 or reliability changing depending on a change in user settings.

Reference numeral 1530 of FIG. 15 shows an example in which the processor 330 cannot determine the second point in the first image frame 1210 when reliability of the gaze information 1520 is lower than a threshold value. According to an embodiment, the processor 330 may acquire the gaze information 1520 toward a specific location 1522 through the third camera 350 and, when it is determined that there is no subject having the importance 1510 being higher than or equal to a predetermined value at the location 1522, may not determine the second point.

Reference numeral 1550 of FIG. 15 shows an example in which the processor 330 determines a second point 1552 in the first image frame 1210 when reliability of the gaze information 1540 is higher than or equal to a threshold value. According to an embodiment, the processor 330 may determine the second point 1552 based on the gaze information 1540 even when it is determined that there is no subject having the importance 1510 being higher than or equal to the predetermined value in the first image frame 1210.

Figure 16A:
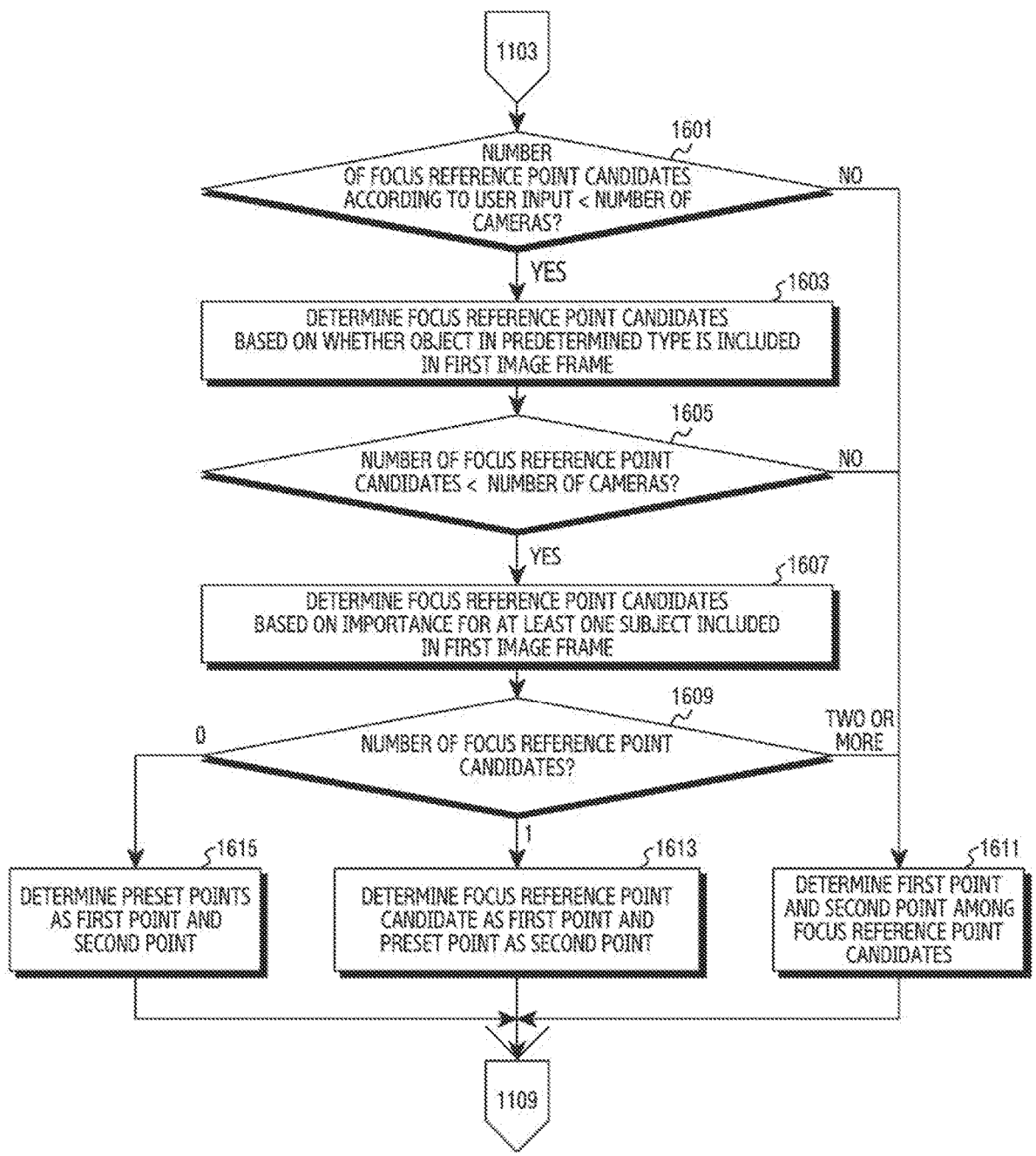
FIG. 16A is a flowchart illustrating the flow of an operation in which the electronic device determines a first point and a second point according to an embodiment.
Figure 16B:
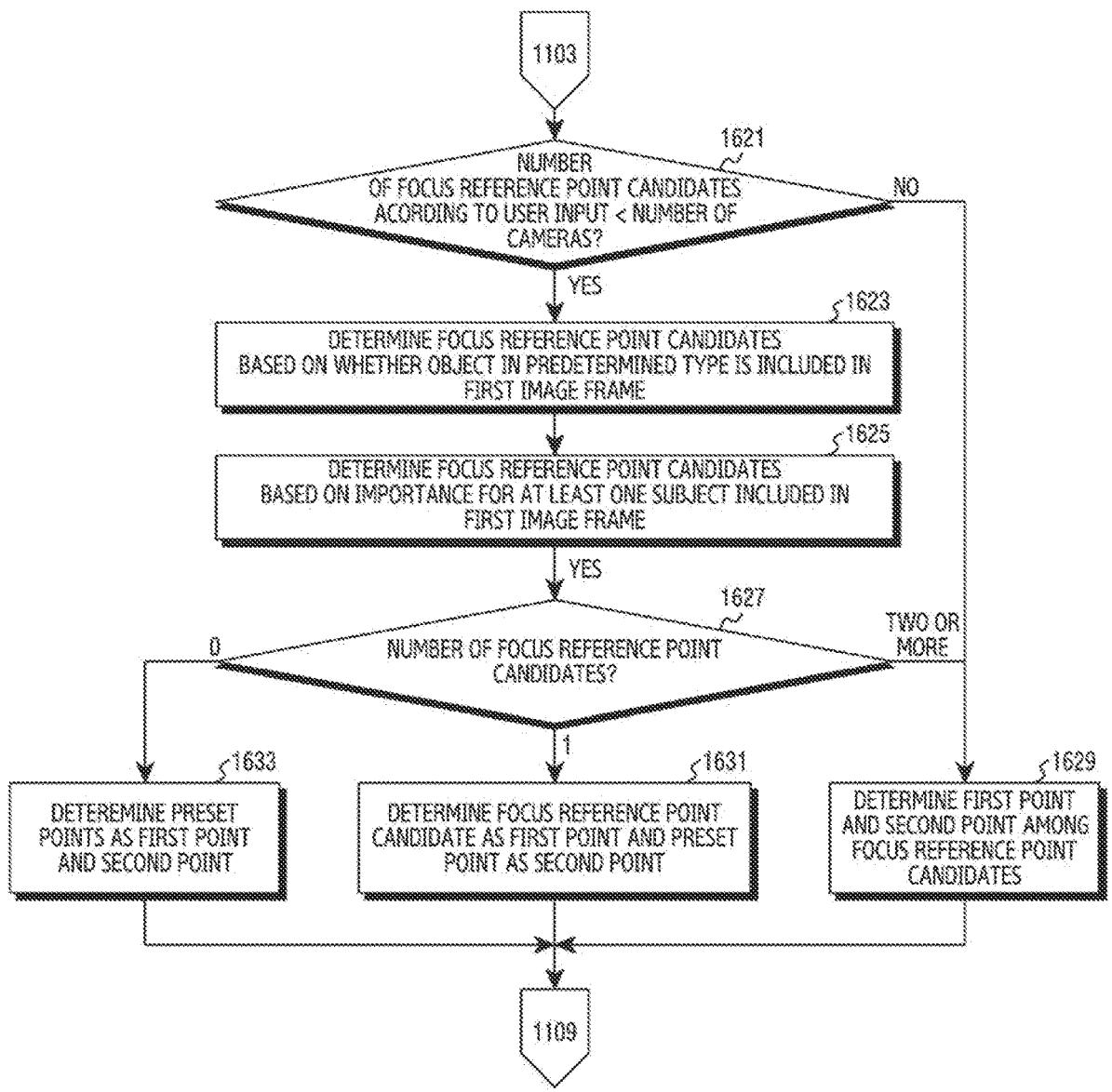
FIG. 16B is a flowchart illustrating the flow of an operation in which the electronic device determines a first point and a second point according to an embodiment.
Figure 16C:
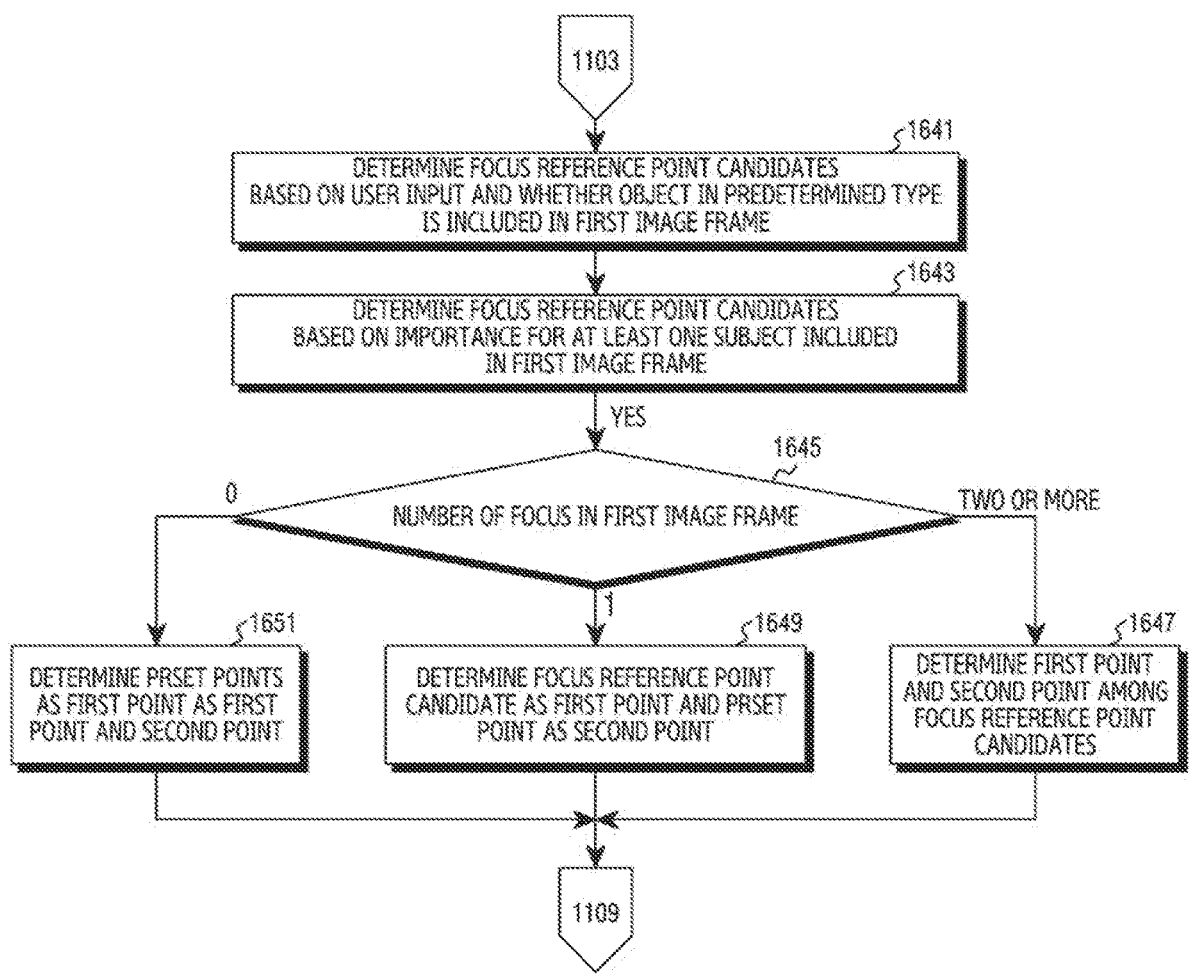
FIG. 16C is a flowchart illustrating the flow of an operation in which the electronic device determines a first point and a second point according to an embodiment.

Although it has been described that the processor 330 determines the first point and the second point through at least some of the user input processing module 371, the importance determination module 373, and the gaze information acquisition module 374 in FIGS. 12 to 15, the processor 330 may also use the object recognition and tracking module 372 or use the object recognition and tracking module 372 instead of them. Embodiments of FIGS. 12 to 15 are only examples, and various other embodiments that can be implemented by those skilled in the art are possible. FIGS. 16A to 16C illustrate various embodiments in which the processor 330 determines that the first point and the second point are within the first image frame based on a user input, whether a predetermined type of an object is included, and importance of subjects included in the image frame.

FIG. 16A is a flowchart illustrating the flow of an operation in which the electronic device 101 determines a first point and a second point. Operations illustrated in FIG. 16A may be performed by the processor 330 of FIG. 3A.

According to an embodiment, the processor 330 may perform operation 1601 after operation 1103 of FIG. 11.

According to an embodiment, in operation 1601, the processor 330 may determine whether the number of focus reference point candidates according to a user input is smaller than the number (for example, two) of cameras (for example, the first camera 310 and the second camera 320). For example, when the processor 330 receives the user input two times or more as in operation 405 of FIG. 4, two or more focus reference point candidates are determined and thus the response corresponds to 'No', and accordingly the processor may perform operation 1611. In another example, when the processor 330 receives the user input one time or less as in operation 705 of FIG. 7 or operation 1105 of FIG. 11, one or less focus reference point candidate is determined and thus the response corresponds to 'Yes', and accordingly the processor may perform operation 1603.

According to an embodiment, in operation 1603, the processor 330 may determine focus reference point candidates based on whether a predetermined type of an object is included in the first image frame. The processor 330 may add focus reference point candidates through the object recognition and tracking operation described with reference to FIG. 8.

According to an embodiment, in operation 1605, the processor 330 may determine whether the number of focus reference point candidates determined according to the user input or according to the object recognition and tracking is smaller than the number (for example, two) of cameras (for example, the first camera and the second camera). For example, when the processor 330 receives the user input once and determines one focus reference point candidate as in operation 1105 of FIG. 11, and additionally acquires one or more focus reference point candidates according to object recognition and tracking in operation 1107 of FIG. 11, the response corresponds to 'No', and accordingly the processor may perform operation 1611. In another example, when the processor 330 receives the user input zero times and determines one or less focus reference point through object recognition and tracking as in operation 705 of FIG. 7, the response corresponds to 'Yes' and accordingly the processor may perform operation 1607.

According to an embodiment, in operation 1607, the processor 330 may determine focus reference point candidates based on importance for at least one subject included in the first image frame. The processor 330 may add the focus reference point candidates through the importance determination operation described with reference to FIG. 9. According to an embodiment, the processor 330 may add a focus reference point candidates based on gaze information for the location where the user's eyes are directed along with the importance for the first image frame.

According to an embodiment, in operation 1609, the processor 330 may determine the number of focus reference point candidates determined according to the user input, object recognition and tracking, or importance determination. According to an embodiment, the processor 330 may determine the number of focus reference point candidates determined according to operation 1601, operation 1603, and operation 1607, perform operation 1611 when the determined number of focus reference point candidates is two or more, perform operation 1613 when the determined number of focus reference point candidates is one, and perform operation 1615 when the determined number of focus reference point candidates is 0. However, although it is premised that the number of rear cameras (for example, the first camera 310 and the second camera 320) disposed on the electronic device 101 is two in FIG. 16A and thus the number is divided into two or more, one, and zero in operation 1609, it is only an example and various embodiments that can be implemented by those skilled in the art are possible. For example, when the number of rear cameras disposed on the electronic device 101 is three, the processor 330 may divide the number into three or more, one, two, and 0 in operation 1609.

According to an embodiment, in operation 1611, the processor 330 may determine a first point and a second point among the focus reference point candidates. For example, when it is determined that the number of focus reference point candidates according to a user input is two, the processor 330 may determine the first point and the second point according to a predetermined priority among the two focus reference point candidates. In another example, when it is determined that the number of focus reference point candidates according to the user input is one and the number of focus reference point candidates according to object recognition and tracking is one, the processor 330 may determine the focus reference point candidate according to the user input as the first point and the focus reference point candidate according to the object recognition and tracking as the second point. In another example, when it is determined that the number of focus reference point candidates according to object recognition and tracking is two, the processor 330 may determine the first point and the second point according to the predetermined priority. In another example, when the number of focus reference point candidates according to object recognition and tracking is one, the number of focus reference point candidates according to importance determination is two, and one of the two focus reference point candidates according to the importance determination overlaps the focus reference point candidate according to the object recognition and tracking, the processor 330 may determine the overlapping focus reference point candidate as the first point and the other focus reference point candidate as the second point. Various other embodiments are possible.

According to an embodiment, in operation 1613, the processor 330 may determine one focus reference point candidate determined in operation 1609 as the first point and a preset point as the second point. For example, the processor 330 may determine the focus reference point candidate determined based on the user input, object recognition and tracking, or importance determination as the first point and determine the preset point as the second point. The processor 330 may acquire a second video focused on the preset point (second point) through the second camera 320 and having a plurality of clearly captured subjects. The preset point may be understood as a hyperfocal distance.

According to an embodiment, in operation 1615, the processor 330 may determine preset points as the first point and the second point. The preset point may correspond to the preset point described with reference to operation 1613. According to another embodiment, the processor 330 may determine the preset point as the first point and may not determine the second point. The processor 330 may acquire the first video focused on the first point (preset point) through the first camera 310 and may not acquire the second video by deactivating the second camera 320. The processor 330 may not acquire the second video by deactivating the second camera 320 even when the preset points are determined as the first point and the second point but the first point and the second point are the same.

According to an embodiment, the processor 330 may perform operation 1109 and operation 1111 described in FIG. 11 after operation 1601 to operation 1615.

FIG. 16B is a flowchart illustrating the flow of an operation in which the electronic device 101 determines a first point and a second point according to an embodiment. Operations illustrated in FIG. 16B may be performed by the processor 330 of FIG. 3A.

According to an embodiment, the processor 330 may perform operation 1621 after operation 1103 of FIG. 11.

According to an embodiment, in operation 1621, the processor 330 may determine whether the number of focus reference point candidates according to a user input is smaller than the number of cameras. Operation 1621 may correspond to operation 1601 described with reference to FIG. 16A.

According to an embodiment, in operation 1623, the processor 330 may determine focus reference point candidates based on whether a predetermined type of an object is included in the first image frame. Operation 1623 may correspond to operation 1603 of FIG. 16A.

According to an embodiment, in operation 1625, the processor 330 may determine focus reference point candidates based on importance for at least one subject included in the first image frame. Operation 1625 may correspond to operation 1607 of FIG. 16A.

In comparison between FIGS. 16A and 16B, there is difference in that the focus reference point candidates are determined based on whether the predetermined type of the object is included in the first image frame and then importance for the first image frame is determined without determination about whether the number of focus reference point candidates is smaller than the number of cameras in FIG. 16B unlike FIG. 16A. Accordingly, compared to the case in which the processor 330 performs the operations of FIG. 16A, the position of the focus reference point candidate according to importance determination can be improved when the operations of FIG. 16B are performed. For example, when the operations of FIG. 16B are performed, the processor 330 may determine the first point and the second point based on the same priority of the focus reference point candidate according to the object recognition and tracking and the focus reference point candidate according to the importance determination.

According to an embodiment, in operation 1627, the processor 330 may determine whether the number of focus reference point candidates is smaller than the number of cameras. According to an embodiment, operation 1627, operation 1629, operation 1631, and operation 1633 may correspond to operation 1609, operation 1611, operation 1613, and operation 1615 of FIG. 16A. That is, operation 1627 and operations after the same may be described with reference to the description of operation 1609 and operations after the same in FIG. 16A.

FIG. 16C is a flowchart illustrating the flow of an operation in which the electronic device 101 determines a first point and a second point according to an embodiment. Operations illustrated in FIG. 16C may be performed by the processor 330 of FIG. 3A.

According to an embodiment, the processor 330 may perform operation 1641 after operation 1103 of FIG. 11.

According to an embodiment, in operation 1641, the processor 330 may determine focus reference point candidates based on a user input and whether a predetermined type of an object is included in the first image frame.

According to an embodiment, in operation 1643, the processor 330 may determine focus reference point candidates based on importance for at least one subject included in the first image frame.

According to an embodiment, in comparison between operation 1641 and operation 1643 of FIG. 16C and FIG. 16A or FIG. 16B, when the processor 330 performs the operations of FIG. 16C, the position of the focus reference point candidate according to the object recognition and tracking and the focus reference point candidate according to the importance determination can be improved. For example, when the processor 330 performs the operations of FIG. 16C, the first point and the second point may be determined based on the same priority of the focus reference point candidate according to the user input, the focus reference point candidate according to the object recognition and tracking, and the focus reference point candidate according to the importance determination.

According to an embodiment, in operation 1645, the processor 330 may determine whether the number of focus reference point candidates is smaller than the number of cameras. According to an embodiment, operation 1645, operation 1647, operation 1649, and operation 1651 may correspond to operation 1609, operation 1611, operation 1613, and operation 1615 of FIG. 16A. That is, operation 1645 and operations after the same may be described with reference to the description of operation 1609 and operations after the same in FIG. 16A.

An electronic device according to an embodiment may include a first camera, a second camera, a display, and at least one processor electrically connected to the first camera, the second camera, and the display. The at least one processor may acquire a first image frame through the first camera, display the first image frame on the display as a preview, determine a first point corresponding to a user input within the first image frame in response to a reception of the user input through the display, determine a second point that is distinguished from the first point and satisfies a predetermined condition within the first image frame, acquire a first video focused on a first subject corresponding to the first point through the first camera, and may acquire a second video focused on a second subject corresponding to the second point through the second camera.

In the electronic device according to an embodiment, the at least one processor may determine whether a predetermined type of an object is included in the first image frame and determine one point corresponding to the second subject as the second point in response to a determination that the second subject is the predetermined type of the object within the first image frame.

In the electronic device according to an embodiment, the predetermined type of the object may include at least one of a human face, human eyes, animal eyes, or an animal body.

In the electronic device according to an embodiment, the at least one processor may determine an importance for at least one subject included in the first image frame and determine the second point based on the importance.

In the electronic device according to an embodiment, the at least one processor may identify a subject having the importance being higher than or equal to a predetermined value within the first image frame and determine one point of an area corresponding to the second subject as the second point in response to a determination that the importance of the second subject is higher than or equal to the predetermined value.

In the electronic device according to an embodiment, the at least one processor may determine the first point corresponding to a first user input within the first image frame in response to a reception of the first user input through the display and determine the second point corresponding to a second user input within the first image frame in response to a reception of the second user input distinguished from the first user input through the display.

In the electronic device according to an embodiment, the first user input and the second user input may include a user touch input for the display.

In the electronic device according to an embodiment, the first camera and the second camera may be disposed in the electronic device to face a first direction, the electronic device may further include a third camera disposed on the electronic device to face a second direction distinguished from the first direction, and the at least one processor may acquire gaze information for a location where the user's eyes are directed on the display through the third camera and determine the second point based on the gaze information.

In the electronic device according to an embodiment, a first field of view (FOV) of the first camera may be included in a second FOV of the second camera, and the at least one processor may acquire a first image frame corresponding to the first FOV through the first camera, acquire a second image frame corresponding to the second FOV through the second camera, acquire a third image frame corresponding to the first FOV by cropping a portion of the second image frame, determine that a third point corresponding to the second point is within the third image frame in response to a determination of the second point being within the first image frame, and may acquire the second video focused on the second subject corresponding to the third point through the second camera.

In the electronic device according to an embodiment, the at least one processor may acquire the third image frame corresponding to the first image frame by performing at least one of lens distortion calibration, white balance calibration, or aperture value calibration on the second image frame.

In the electronic device according to an embodiment, the at least one processor may acquire a fourth image frame that is focused on the second subject through the second camera and corresponds to the second FOV, acquire a fifth image frame corresponding to the first FOV by cropping a portion of the fourth image frame, and may acquire the second video based on the fifth image frame having a resolution improved through up-scaling of the fifth image frame.

A method of operating an electronic device according to an embodiment may include an operation of acquiring a first image frame through a first camera included in the electronic device, an operation of displaying the first image frame on a display included in the electronic device as a preview, an operation of determining a first point corresponding to a user input within the first image frame in response to a reception of the user input through the display, an operation of determining a second point that is distinguished from the first point and satisfies a predetermined condition within the first image frame, an operation of acquiring a first video focused on a first subject corresponding to the first point through the first camera, and an operation of acquiring a second video focused on a second subject corresponding to the second point through the second camera included in the electronic device.

In the method of operating the electronic device according to an embodiment, the operation of determining the second point satisfying the predetermined condition may include an operation of determining whether a predetermined type of an object is included in the first image frame and an operation of determining one point corresponding to the second subject as the second point in response to a determination that the second subject is the predetermined type of the object within the first image frame.

In the method of operating the electronic device according to an embodiment, the operation of determining the second point satisfying the predetermined condition may include an operation of determining importance for at least one subject included in the first image frame, an operation of identifying a subject having the importance being higher than or equal to a predetermined value within the first image frame, and an operation of determining one point of an area corresponding to the second subject as the second point in response to a determination that the importance of the second subject is higher than or equal to the predetermined value.

In the method of operating the electronic device according to an embodiment, the operation of determining the first point may include an operation of determining the first point corresponding to a first user input within the first image frame in response to a reception of the first user input through the display, and the operation of determining the second point satisfying the predetermined condition may include an operation of determining the second point corresponding to a second user input within the first image frame in response to a reception of the second user input distinguished from the first user input through the display.

An electronic device according to an embodiment may include a first camera, a second camera, a display, and at least one processor electrically connected to the first camera, the second camera, and the display. The at least one processor may acquire a first image frame through the first camera, display the first image frame on the display as a preview, determine whether a user input is received through the display, determine whether a predetermined type of an object is included in the first image frame, determine an importance for at least one subject included in the first image frame, determine that a first point and a second point are within the first image frame based on at least one of whether the user input is received, whether the predetermined type of the object is included, or the importance, acquire a first video focused on a first subject corresponding to the first point through the first camera, and may acquire a second video focused on a second subject corresponding to the second point through the second camera.

In the electronic device according to an embodiment, the predetermined type of the object may include at least one of a human face, human eyes, animal eyes, or an animal body.

In the electronic device according to an embodiment, the at least one processor may identify a subject having the importance being higher than or equal to a predetermined value within the first image frame and determine one point of an area corresponding to the subject determined to have the importance being higher than or equal to the predetermined value as at least one of the first point or the second point.

In the electronic device according to an embodiment, the first camera and the second camera may be disposed in the electronic device to face a first direction, the electronic device further may include a third camera disposed on the electronic device to face a second direction distinguished from the first direction, and the at least one processor may acquire gaze information for a location where a user's eyes are directed on the display through the third camera and determine at least one of the first point or the second point based on the gaze information.

The electronic device according to an embodiment may further include a memory electrically connected to the at least one processor, and the at least one processor may store the first video and the second video in the memory.

The invention claimed is:

1. An electronic device, comprising:
   first and second cameras;
   a display; and
   a processor electrically connected to the first and second cameras and the display and configured to:
   acquire a first image frame through the first camera,
   preview the first image frame on the display,
   determining importances for a first subject and a second subject included in the first image frame;
   in response to receiving a first user input through the display of which a touch duration time is longer than or equal to a threshold time, determine that a first point corresponding to the first user input is within the first image frame,
   in response to a reception of a second user input within the first image frame through the display distinguished from the first user input through the display, determine that a second point, which corresponds to the secret user input and is distinguished from the first point and satisfies a predetermined condition in that a touch duration time of the second user input is longer than or equal to the threshold time and for which the importance is higher than or equal to a predetermined value, is within the first image frame,
   acquire a first video focused on the first subject corresponding to the first point through the first camera, and
   acquire a second video focused on the second subject corresponding to the second point through the second camera.

2. The electronic device of claim 1, wherein the at least one processor is configured to:
   determine whether a predetermined type of an object is included in the first image frame, and
   determine one point corresponding to the second subject as the second point in response to a determination that the second subject is the predetermined type of the object within the first image frame.

3. The electronic device of claim 2, wherein the predetermined type of the object comprises at least one of a human face, human eyes, animal eyes, or an animal body.

4. The electronic device of claim 1, wherein the first user input and the second user input comprise a user touch input for the display.

5. The electronic device of claim 1, wherein the first camera and the second camera are disposed in the electronic device to face a first direction,
further comprising a third camera disposed on the electronic device to face a second direction distinguished from the first direction, and
wherein the at least one processor is configured to:
acquire gaze information for a location where a user's eyes are directed on the display through the third camera, and
determine the second point based on the gaze information.

6. An electronic device, comprising:
first and second cameras;
a display; and
a processor electrically connected to the first and second cameras and the display and configured to:
acquire a first image frame through the first camera,
preview the first image frame on the display,
in response to receiving a user input through the display, determine that a first point corresponding to the user input is within the first image frame,
determine that a second point, which is distinguished from the first point and satisfies a predetermined condition, is within the first image frame,
acquire a first video focused on a first subject corresponding to the first point through the first camera, and
acquire a first video focused on a first subject corresponding to the first point through the first camera, and
acquire a second video focused on a second subject corresponding to the second point through the second camera,
wherein a first field of view, FOV, of the first camera is included in a second FOV of the second camera, and
the at least one processor is configured to:
acquire a first image frame corresponding to the first FOV through the first camera,
acquire a second image frame corresponding to the second FOV through the second camera,
acquire a third image frame corresponding to the first FOV by cropping a portion of the second image frame,
determine that a third point corresponding to the second point is within the third image frame in response to a determination of the second point being within the first image frame, and
acquire the second video focused on the second subject corresponding to the third point through the second camera.

7. The electronic device of claim 6, wherein the at least one processor is configured to acquire the third image frame corresponding to the first image frame by performing at least one of lens distortion calibration, white balance calibration, or aperture value calibration on the second image frame.

8. The electronic device of claim 6, wherein the at least one processor is configured to:
acquire a fourth image frame that is focused on the second subject through the second camera and corresponds to the second FOV,
acquire a fifth image frame corresponding to the first FOV by cropping a portion of the fourth image frame, and
acquire the second video based on the fifth image frame having a resolution improved through up-scaling of the fifth image frame.

9. A method of operating an electronic device comprising first and second cameras, the method comprising:
acquiring a first image frame through the first camera;
determining importances for a first subject and a second subject included in the first image frame;
displaying the first image frame on a display included in the electronic device as a preview;
determining a first point corresponding to a first user input within the first image frame of which a touch duration time is longer than or equal to a threshold time in response to a reception of the first user input through the display;
determining, in response to a reception of a second user input within the first image frame through the display distinguished from the first user input through the display, a second point, which corresponds to the second user input and is distinguished from the first point and satisfies a predetermined condition in that a touch duration time of the second user input is longer than or equal to the threshold time and for which the importance is higher than or equal to a predetermined value, is within the first image frame;
acquiring a first video focused on the first subject corresponding to the first point through the first camera; and
acquiring a second video focused on the second subject corresponding to the second point through the second camera included in the electronic device.

10. The method of claim 9, wherein the determining of the second point satisfying the predetermined condition comprises:
determining whether a predetermined type of an object is included in the first image frame; and
determining one point corresponding to the second subject as the second point in response to a determination that the second subject is the predetermined type of the object within the first image frame.

11. The method of claim 9, wherein the determining of the first point comprises determining the first point corresponding to a first user input within the first image frame in response to a reception of the first user input through the display, and
the determining of the second point satisfying the predetermined condition comprises determining the second point corresponding to a second user input within the first image frame in response to a reception of the second user input distinguished from the first user input through the display.

12. An electronic device comprising:
a first camera;
a second camera;
a display; and
at least one processor electrically connected to the first camera, the second camera, and the display,
wherein the at least one processor is configured to:
acquire a first image frame through the first camera,
display the first image frame on the display as a preview,
determine whether a first user input and a second user input are received through the display, whether a predetermined type of an object is included in the first image frame and an importance for at least one subject included in the first image frame,
determine that a first point corresponding to the first user input and that a second point corresponding to the second user input are within the first image frame based on the first user input and the second user input being received and based on the predetermined type of the object being included and the importance being higher than or equal to a predetermined value within the first image frame,
acquire a first video focused on a first subject corresponding to the first point through the first camera, and acquire a second video focused on a second subject corresponding to the second point through the second camera.

13. The electronic device of claim 12, wherein the predetermined type of the object comprises at least one of a human face, human eyes, animal eyes, or an animal body.

14. The electronic device of claim 12, wherein the at least one processor is configured to:
   identify a subject having the importance being higher than or equal to the predetermined value within the first image frame, and
   determine one point of an area corresponding to the subject determined to have the importance being higher than or equal to the predetermined value as at least one of the first point or the second point.

15. The electronic device of claim 12, wherein the first camera and the second camera are disposed in the electronic device to face a first direction,
   further comprising a third camera disposed on the electronic device to face a second direction distinguished from the first direction, and
   wherein the at least one processor is configured to:
   acquire gaze information for a location where a user's eyes are directed on the display through the third camera and
   determine at least one of the first point or the second point based on the gaze information.

16. The electronic device of claim 12, further comprising a memory electrically connected to the at least one processor,
   wherein the at least one processor is configured to store the first video and the second video in the memory.

* * * * *